(12) United States Patent  
Jiang et al.

(10) Patent No.: US 12,379,593 B2  
(45) Date of Patent: Aug. 5, 2025

(54) LAMINATED GLASS AND HEAD-UP DISPLAY SYSTEM

(71) Applicant: FUYAO GLASS INDUSTRY GROUP CO., LTD., Fujian (CN)

(72) Inventors: Bingming Jiang, Fujian (CN); Wei Chen, Fujian (CN); Jian Peng, Fujian (CN); Jinliang Guan, Fujian (CN); Weijun Li, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 0 days.

(21) Appl. No.: 18/887,524

(22) Filed: Sep. 17, 2024

(65) Prior Publication Data

US 2025/0013042 A1 Jan. 9, 2025

Related U.S. Application Data

(63) Continuation of application No. 18/626,900, filed on Apr. 4, 2024, which is a continuation of application No. PCT/CN2022/123855, filed on Oct. 8, 2022.

(30) Foreign Application Priority Data

Oct. 8, 2021 (CN) .......................... 202111173403.2  
Oct. 8, 2021 (CN) .......................... 202111173404.7

(51) Int. Cl.  
*G02B 27/01* (2006.01)  
*B32B 17/10* (2006.01)  
(Continued)

(52) U.S. Cl.  
CPC .... *G02B 27/0101* (2013.01); *B32B 17/10036* (2013.01); *B32B 17/10201* (2013.01);  
(Continued)

(58) Field of Classification Search  
CPC .......................... G02B 27/0101; G02B 5/3041  
See application file for complete search history.

(56) References Cited

U.S. PATENT DOCUMENTS

2017/0242247 A1 8/2017 Tso et al.  
2017/0343806 A1 11/2017 Anzai et al.  
(Continued)

FOREIGN PATENT DOCUMENTS

CN 101038349 A 9/2007  
CN 102471153 A 5/2012  
(Continued)

OTHER PUBLICATIONS

International Search Report dated Jan. 6, 2023 issued in PCT/CN2022/123855.  
(Continued)

*Primary Examiner* — Joseph P Martinez  
(74) *Attorney, Agent, or Firm* — Scully, Scott, Murphy & Presser, P.C.

(57) ABSTRACT

The disclosure relates to a laminated glass and a head-up display system. The laminated glass includes a first transparent substrate, a second transparent substrate, and an adhesive film. The laminated glass has a light-transmitting region and a light-blocking region surrounding at least part of a periphery of the light-transmitting region. The adhesive film is disposed between the first transparent substrate and the first transparent substrate and configured to adhere the first transparent substrate and the second transparent substrate. The light-transmitting region has a visible light transmittance greater than or equal to 70%. The light-blocking region has a visible light transmittance less than or equal to 5%. The light-blocking region has a first region located (Continued)

below the light-transmitting region, and the first region has one or more first function display regions for displaying of image.

20 Claims, 12 Drawing Sheets

(51) Int. Cl.
  *B60K 35/231* (2024.01)
  *G02B 5/30* (2006.01)
(52) U.S. Cl.
  CPC .... *B32B 17/1022* (2013.01); *B32B 17/10495* (2013.01); *B32B 17/10568* (2013.01); *B32B 17/10651* (2013.01); *B32B 17/10779* (2013.01); *B60K 35/231* (2024.01); *G02B 5/3041* (2013.01); *B32B 2457/206* (2013.01); *B32B 2605/08* (2013.01); *B60K 2360/785* (2024.01)

(56) References Cited

U.S. PATENT DOCUMENTS

| | | | |
|---|---|---|---|
| 2019/0009502 A1 | 1/2019 | Labrot | |
| 2020/0147934 A1 | 5/2020 | Arndt et al. | |
| 2021/0018749 A1 | 1/2021 | Fischer et al. | |
| 2022/0024282 A1* | 1/2022 | Chiba | B60J 1/002 |
| 2024/0192491 A1* | 6/2024 | Chen | B32B 3/263 |

FOREIGN PATENT DOCUMENTS

| | | | |
|---|---|---|---|
| CN | 106094213 | A | 11/2016 |
| CN | 107148343 | A | 9/2017 |
| CN | 107209389 | A | 9/2017 |
| CN | 108535867 | A | 9/2018 |
| CN | 108883982 | A | 11/2018 |
| CN | 108973608 | A | 12/2018 |
| CN | 109247015 | A | 1/2019 |
| CN | 109626848 | A | 4/2019 |
| CN | 110341598 | A | 10/2019 |
| CN | 110520782 | A | 11/2019 |
| CN | 110856440 | A | 2/2020 |
| CN | 111212818 | A | 5/2020 |
| CN | 211595444 | U | 9/2020 |
| CN | 111918850 | A | 11/2020 |
| CN | 112513716 | A | 3/2021 |
| CN | 113165973 | A | 7/2021 |
| DE | 102020106160 | A1 | 9/2021 |
| JP | H08091094 | A | 4/1996 |
| JP | 3210995 | U | 6/2017 |
| JP | 2019511406 | A | 4/2019 |
| JP | 2019073408 | A | 5/2019 |
| WO | 2019022007 | A1 | 1/2019 |
| WO | 2020105306 | A1 | 5/2020 |
| WO | 2021145387 | A1 | 5/2020 |
| WO | 2020116586 | A1 | 6/2020 |
| WO | 2020193986 | A1 | 10/2020 |
| WO | 2022266477 | A1 | 12/2022 |
| WO | 2023138830 | A1 | 7/2023 |

OTHER PUBLICATIONS

First Office Action dated Apr. 25, 2022 received in Chinese Patent Application No. 202111173403.2.
Notice of Allowance dated Mar. 24, 2023 received in Chinese Patent Application No. 202111173403.2.
First Office Action dated Apr. 25, 2022 received in Chinese Patent Application No. 202111173404.7.
Non-final rejection issued in corresponding U.S. Appl. No. 18/626,900 dated Dec. 19, 2024.
The extended European search report issued in corresponding EP application No. 22877960.9 dated Dec. 9, 2024.
Notice of Reasons for Refusal dated Mar. 27, 2025 received in Japanese Patent Application No. 2024-521203.

* cited by examiner

LAMINATED GLASS AND HEAD-UP DISPLAY SYSTEM

CROSS-REFERENCE TO RELATED APPLICATION(S)

This application is a continuation of U.S. application Ser. No. 18/626,900, filed Apr. 4, 2024, which is a continuation of International Application No. PCT/CN2022/123855, filed Oct. 8, 2022, which claims priority to Chinese Patent Application No. 202111173403.2, filed Oct. 8, 2021, and Chinese Patent Application No. 202111173404.7, filed Oct. 8, 2021, the entire disclosures of which are hereby incorporated by reference in their entireties.

TECHNICAL FIELD

The disclosure relates to the field of automobiles, and in particular, to a laminated glass and a head-up display system.

BACKGROUND

With the development of automotive intelligence, head-up display (HUD) systems are increasingly applied to automobiles to project images, such as real-time driving information, onto a front windshield. Due to the front windshield being laminated glass, a light ray emitted by a projection light source of the HUD system will undergo reflection when passing through each of two surfaces of the laminated glass in contact with air. The reflection on each of the two surfaces causes deviation, resulting in two mutually interfering ghost images, thus leading to a decrease in the quality of the image projected onto the front windshield.

SUMMARY

A laminated glass is provided in the disclosure. The laminated glass includes a first transparent substrate, a second transparent substrate, and an adhesive film. The first transparent substrate has a first surface and a second surface opposite the first surface. The second transparent substrate has a third surface and a fourth surface opposite the third surface. The third surface is closer to the second surface than the fourth surface. The laminated glass has a light-transmitting region and a light-blocking region surrounding at least part of a periphery of the light-transmitting region. The adhesive film is disposed between the second surface and the third surface and configured to adhere the first transparent substrate and the second transparent substrate. The light-transmitting region has a visible light transmittance greater than or equal to 70%. The light-blocking region has a visible light transmittance less than or equal to 5%. The light-blocking region has a first region located below the light-transmitting region, and the first region has one or more first function display regions for displaying of a first image.

In some embodiments, the light-blocking region further has a second region located above the light-transmitting region and a third region disposed at two sides of the light-transmitting region.

In some embodiments, at least one flexible display screen is disposed in the first function display region. The at least one flexible display screen is disposed between the second surface and the third surface and includes at least one of a mini light-emitting diode (LED) display screen, a micro LED display screen, or an organic light-emitting diode (OLED) display screen.

In some embodiments, the first function display region is configured to receive a projection light ray for forming the first image that is incident at an angle of 50° to 72°. The first function display region has a reflectivity for the projection light ray incident greater than or equal to 4%.

In some embodiments, the first function display region is part of the fourth surface, a proportion of S-polarized light in the projection light ray incident ranges from 60% to 100%. The first function display region has the reflectivity for the projection light ray incident greater than or equal to 8%.

In some embodiments, the laminated glass further includes a dielectric film disposed in the first function display region, the dielectric film is on the third surface or the fourth surface. A proportion of P-polarized light in the projection light ray incident ranges from 60% to 100%, and the first function display region has the reflectivity for the projection light ray incident greater than or equal to 8%. Alternatively, a proportion of S-polarized light in the projection light ray incident ranges from 60% to 100%, and the first function display region has the reflectivity for the projection light ray incident greater than or equal to 8%.

In some embodiments, the laminated glass further includes a metal film disposed in the first function display region. The metal film is on the third surface. A proportion of P-polarized light in the projection light ray incident ranges from 60% to 100%. The first function display region has the reflectivity for the projection light ray incident greater than or equal to 6%.

In some embodiments, the laminated glass further includes a laminated polyethylene terephthalate (PET) disposed in the first function display region, a proportion of P-polarized light in the projection light ray incident ranges from 60% to 100%. The first function display region has the reflectivity for the projection light ray incident greater than or equal to 10%.

In some embodiments, the laminated glass further includes a dark ink layer or a colored polymer film disposed in the light-blocking region. The dark ink layer is disposed on at least one of the second surface or the third surface. The colored polymer film is disposed between the second surface and the third surface.

In some embodiments, the flexible display screen or the display region is closer to the fourth surface than the dark ink layer or the colored polymer film.

In some embodiments, the fourth surface has a colored region. An upper boundary of the first region is at least 80 mm higher than an upper boundary of the colored region located in the first region.

In some embodiments, the light-transmitting region has one or more second function display regions. The one or more second function display regions are configured for displaying of a second image.

In some embodiments, a projection display distance for the first image ranges from 0.5 m to 5 m, and a projection display distance for the second image is greater than or equal to 7.5 m.

In some embodiments, a projection light ray for forming the first image is incident on the one or more first function display regions at an angle of 50° to 72°. The one or more first function display regions have a reflectivity, for the projection light ray for forming the first image, greater than or equal to 4%. A projection light ray for forming the second image is incident on the one or more second function display regions at an angle of 50° to 72°. The one or more second function display regions have a reflectivity, for the projection light ray for forming the second image, greater than or equal to 8%.

In some embodiments, the laminated glass further includes a dielectric film. The dielectric film is at least located in the one or more second function display regions.

In some embodiments, the dielectric film is further located in the one or more first function display regions.

In some embodiments, the adhesive film is of uniform thickness. A proportion of P-polarized light in the projection light ray for forming the second image ranges from 60% to 100%. The dielectric film is a laminated structure formed by a high refractive index layer and a low refractive index layer stacked with each other or includes at least one metal layer or laminated PET. The the one or more second function display regions have the reflectivity, for the projection light ray for forming the second image incident at an angle of 50° to 72°, greater than or equal to 10%.

In some embodiments, the adhesive film is of uniform thickness or wedge-shaped. The dielectric film is disposed on the fourth surface and is an anti-reflective film. The second function display region is part of the first surface. A proportion of S-polarized light in the projection light ray for forming the second image ranges from 60% to 100%. The anti-reflective film has a reflectivity for the projection light ray for forming the second image less than or equal to 6%. The one or more second function display regions have the reflectivity, for the projection light ray for forming the second image incident at an angle of 50° to 72°, greater than or equal to 8%.

In some embodiments, the adhesive film is wedge-shaped, a proportion of S-polarized light in the projection light ray for forming the second image ranges from 60% to 100%. The dielectric film is a laminated structure disposed on the third surface or the fourth surface and formed by a high refractive index layer and a low refractive index layer stacked with each other. The one or more second function display regions have the reflectivity, for the projection light ray for forming the second image incident at an angle of 50° to 72°, greater than or equal to 28%.

In some embodiments, the adhesive film is wedge-shaped, the second function display region is part of the fourth surface, a proportion of S-polarized light in the projection light ray for forming the second image ranges from 60% to 100%. The one or more second function display regions have the reflectivity, for the projection light ray for forming the second image incident at the angle of 50° to 72°, greater than or equal to 8%.

In some embodiments, a proportion of S-polarized light in a projection light ray for forming the first image ranges from 60% to 100%, or a proportion of P-polarized light in the projection light ray for forming the first image ranges from 60% to 100%.

In some embodiments, the light-transmitting region further has a primary viewing region. The one or more second function display regions are disposed within the primary viewing region, and a lower boundary of the primary viewing region is at least 25 mm higher than an upper boundary of the first region.

A head-up display system is further provided in the disclosure. The head-up display system includes a first projection light source and the above-mentioned laminated glass. The first projection light source is configured to emit a projection light ray for forming the first image to the first function display region.

In some embodiments, the light-transmitting region has one or more second function display regions. The head-up display system further includes a second projection light source. The second projection light source is configured to emit a projection light ray for forming a second image to the second function display region.

In some embodiments, a proportion of P-polarized light in the projection light ray for forming the first image ranges from 60% to 100%, and a proportion of S-polarized light in the projection light ray for forming the second image ranges from 60% to 100%.

In some embodiments, a proportion of S-polarized light in the projection light ray for forming the first image ranges from 60% to 100%, and a proportion of P-polarized light in the projection light ray for forming the second image ranges from 60% to 100%.

In some embodiments, a proportion of P-polarized light in the projection light ray for forming the first image ranges from 60% to 100%, and a proportion of P-polarized light in the projection light ray for forming the second image ranges from 60% to 100%.

In some embodiments, a proportion of S-polarized light in the projection light ray for forming the first image ranges from 60% to 100%, and a proportion of S-polarized light in the projection light ray for forming the second image ranges from 60% to 100%.

The laminated glass provided in the embodiments of the disclosure has the light-blocking region, which can reduce or even block reflected light A, where light incident on the fourth surface can enter the laminated glass and then be reflected by the first transparent substrate to form the reflected light A, thereby weakening or even blocking ghosting caused by the reflected light A and the reflected light B, where light incident on the fourth surface can enter the laminated glass and then be reflected by the second transparent substrate to form the reflected light B. Additionally, the laminated glass provided in the embodiments of the disclosure can reduce or even block incident light C which is incident on the first surface to enter the laminated glass, thereby weakening or even blocking ghosting caused by the reflected light B and the incident light C. Therefore, it can be seen that the laminated glass provided in the embodiments of the disclosure can enhance the quality of images projected thereon.

Figure 1:
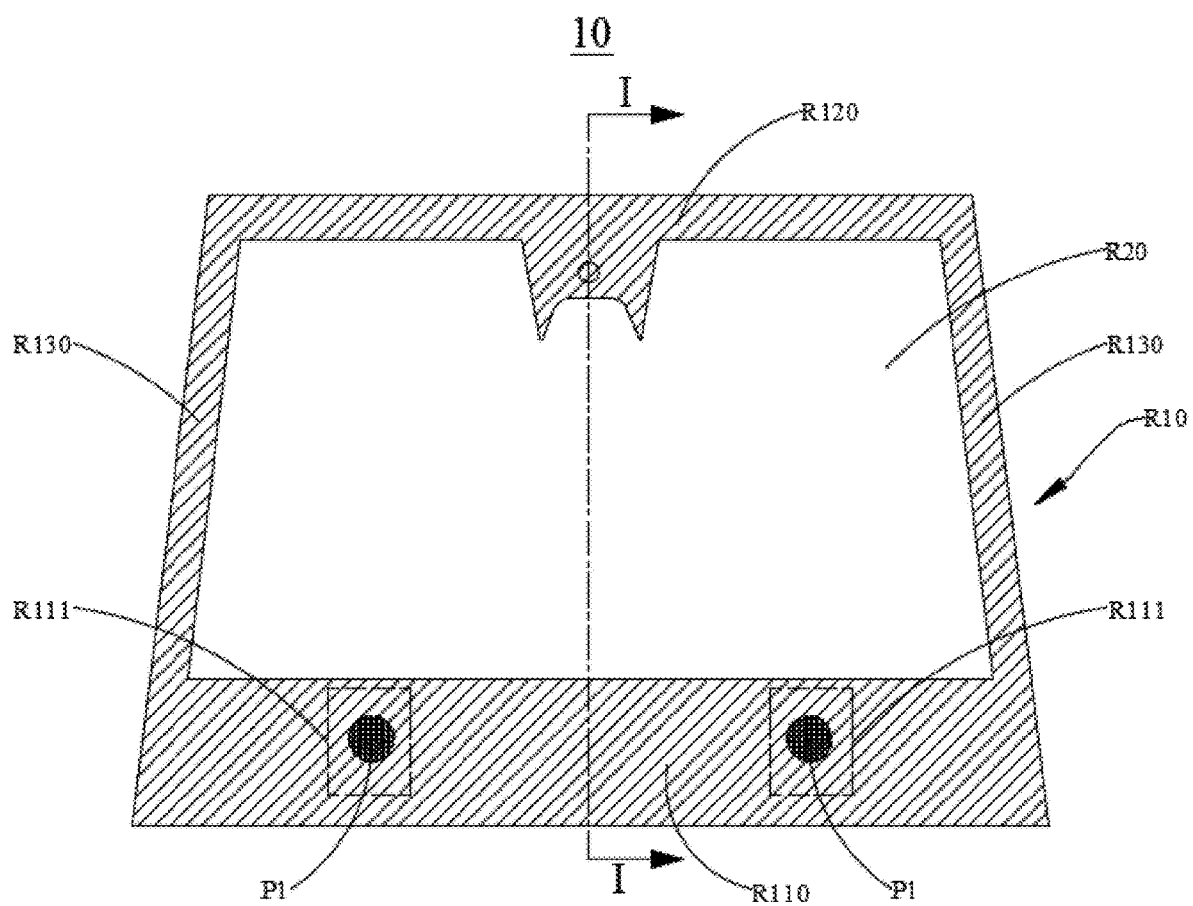
FIG. 1 is a schematic structural view illustrating region division of a laminated glass provided in an embodiment of the disclosure.

Reference numbers are described as follows:

laminated glass 10, first transparent substrate 110, first surface 111, second surface 112, second transparent substrate 120, third surface 121, fourth surface 122, light-blocking region R10, light-transmitting region R20, adhesive film 130, masking layer 140, first region R110, first function display region R111, first image P1, second region R120, third region R130, dielectric film 150, flexible display screen 160, first projection light source 170, primary viewing region R210, second function display region R211, second image P2, colored region R30, colored layer 180, second projection light source 190, vehicle 1, vehicle body 20.

DETAILED DESCRIPTION

The technical solutions in the embodiments of the disclosure are clearly and completely described in the following with reference to the accompanying drawings in the embodiments of the disclosure. Apparently, the described embodiments are merely a part of rather than all the embodiments of the disclosure. All other embodiments obtained by those of ordinary skill in the art based on the embodiments of the disclosure without creative efforts are within the scope of the disclosure.

The term "embodiment" or "example" referred to herein means that a particular feature, structure, or feature described in connection with the embodiment or example may be contained in at least one embodiment of the disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

Figure 2:
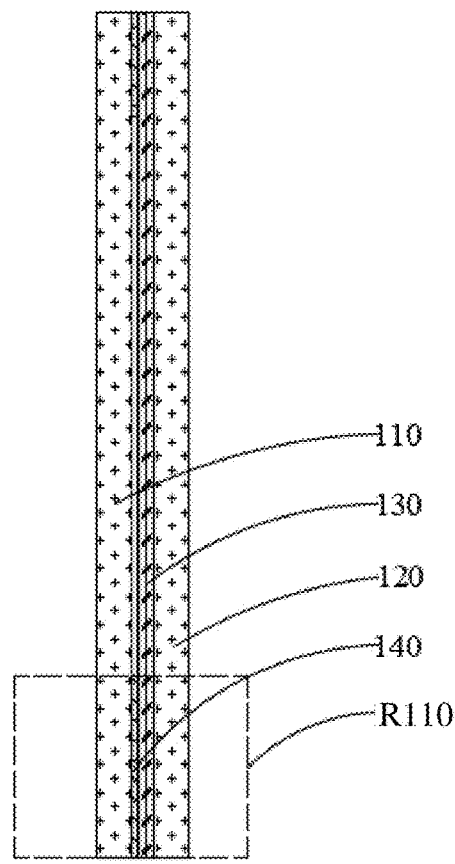
FIG. 2 is a cross-sectional view of the laminated glass taken along line I-I of FIG. 1 according to an embodiment of the disclosure.
Figure 3:
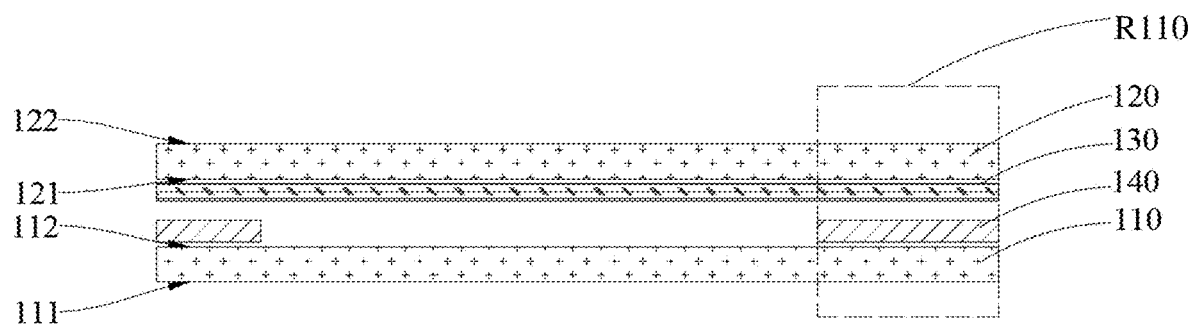
FIG. 3 is an exploded cross-sectional structural view of the laminated glass taken along line I-I of FIG. 1 according to an embodiment of the disclosure.

Referring to FIGS. 1 to 3, FIG. 1 is a schematic structural view illustrating region division of a laminated glass provided in an embodiment of the disclosure, FIG. 2 is a cross-sectional view of the laminated glass taken along line I-I od FIG. 1 according to an embodiment of the disclosure, and FIG. 3 is an exploded cross-sectional structural view of the laminated glass taken along line I-I of FIG. 1 according to an embodiment of the disclosure. A laminated glass 10 is provided in the disclosure. The laminated glass 10 includes a first transparent substrate 110, a second transparent substrate 120, and an adhesive film 130. The first transparent substrate 110 has a first surface 111 and a second surface 112 opposite the first surface 111. The second transparent substrate 120 has a third surface 121 and a fourth surface 122 opposite the third surface 121. The third surface 121 is closer to the second surface 112 than the fourth surface 122. The laminated glass 10 has a light-transmitting region R20 and a light-blocking region R10 surrounding at least part of a periphery of the light-transmitting region R20. The adhesive film 130 is disposed between the second surface 112 and the third surface 121 and configured to adhere the first transparent substrate 110 and the second transparent substrate 120. The light-transmitting region R20 has a visible light transmittance greater than or equal to 70%. The light-blocking region R10 has a visible light transmittance less than or equal to 5%. The light-blocking region R10 has a first region R110 located below the light-transmitting region R20, and the first region R110 has one or more first function display regions R111 for displaying of a first image P1.

In an embodiment, the first transparent substrate 110 is in close connection with the second transparent substrate 120 via the adhesive film 130. In order to conveniently and clearly illustrate a layered structure of the laminated glass 10, in the disclosure, a cross-sectional view of FIG. 1 taken along line I-I is rotated by 90 degrees counterclockwise, all the structures of the laminated glass 10 are separated, and the thickness of all the structures is amplified. For the convenience of illustration, the resulting figured is referred to as an exploded cross-sectional structural view taken along line I-I of FIG. 1. For example, referring to FIG. 3, FIG. 3 is an exploded cross-sectional structural view taken along line I-I of FIG. 1 according to an embodiment of the disclosure. FIG. 3 is obtained by rotating FIG. 2 by 90 degrees counterclockwise, separating all structures of the laminated glass 10, and amplifying the thickness of all structures. It can be understood that, the subsequent exploded cross-sectional structural views are also illustrated with reference to the processing manners of FIGS. 2 and 3, and will not be described in detail hereinafter.

Each of the first transparent substrate 110 and the second transparent substrate 120 may be a curved plate with light-transmitting capabilities. For example, each of the first transparent substrate 110 and the second transparent substrate 120 may be made of inorganic glass or organic glass. The inorganic glass may be, for example, soda-lime-silica glass, aluminum silicate glass, lithium aluminum silicate glass, or borosilicate glass. The organic glass may be, for example, polycarbonate (PC) glass, polymethyl methacrylate (PMMA) glass, or the like. Each of the first transparent substrate 110 and the second transparent substrate 120 may be transparent, or may be colored and have light-transmitting capabilities. The material of the first transparent substrate 110 may be the same as or different from the material of the second transparent substrate 120.

The light-transmitting region R20 is a region of the laminated glass 10 through which visible light can pass. In order to ensure driving safety after the laminated glass 10 is mounted to a vehicle, a visible light transmittance of the light-transmitting region R20 is preferably greater than or equal to 70%. The light-blocking region R10 refers to a region of the laminated glass 10 where a visible light transmittance is relatively low. The light-blocking region R10 is disposed around a periphery of the laminated glass 10.

The adhesive film 130 is disposed between the first transparent substrate 110 and the second transparent substrate 120 to adhere the first transparent substrate 110 and the second transparent substrate 120. The adhesive film 130 may be implemented in two structures, which will be described in detail hereinafter.

The laminated glass 10 further includes a masking layer 140 disposed in the light blocking region R10. The masking layer 140 may be a dark ink layer or a colored polymer film. The dark ink layer is disposed on at least one of the second surface 112 or the third surface 121. The colored polymer film is disposed between the second surface 112 and the third surface 121. The masking layer 140 has a low transmittance for a projection light ray. The masking layer 140 is carried on the first transparent substrate 110 or the second transparent substrate 120 and located in the light-blocking region R10. The masking layer 140 may be formed in the light-blocking region R10 through processes such as printing ink. Optionally, the masking layer 140 has a transmittance for the projection light ray less than or equal to 5%, preferably less than or equal to 1%. Optionally, the masking layer 140 may also be made of a resin film with dark color and low light transmittance. Alternatively, the masking layer 140 may also be made of a resin film with light color and low light transmittance. The resin film may be, for example, a polyvinyl butyral (PVB) or polyethylene terephthalate (PET) which is mass colored.

Figure 4:
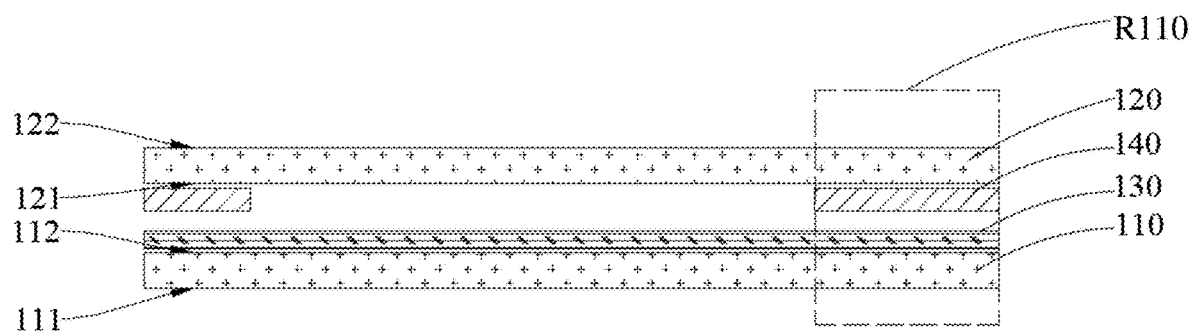
FIG. 4 is an exploded cross-sectional structural view of the laminated glass taken along line I-I of FIG. 1 according to another embodiment of the disclosure.

In an embodiment, referring to FIG. 3, FIG. 3 is an exploded cross-sectional structural view of the laminated glass 10 taken along line I-I of FIG. 1 according to one embodiment of the disclosure. The masking layer 140 is disposed on the second surface 112. In another embodiment of the disclosure, referring to FIG. 4, FIG. 4 is an exploded cross-sectional structural view taken along line I-I of FIG. 1 according to another embodiment of the disclosure. The masking layer 140 is disposed on the third surface 121.

Specifically, if the laminated glass 10 does not include the masking layer 140, a projection light ray emitted by a projection device in the vehicle, for forming the first image P1 onto the laminated glass 10, is incident on the fourth surface 122 to enter the laminated glass 10, and then will be reflected by the first surface 111 of the first transparent substrate 110 to form reflected light A. Accordingly, the projection light ray incident onto the laminated glass 10 will also be reflected by the fourth surface 122 of the second transparent substrate 120 to enter the human eye. For the convenience of illustration, the projection light ray reflected by the fourth surface 122 is referred to as reflected light B. The reflected light B forms a main image visible to the human eye. The reflected light A forms a secondary image visible to the human eye. There is a certain offset between the secondary image and the main image. That is, a phenomenon of ghosting occurs. In the embodiments of the disclosure, the laminated glass 10 includes the masking layer 140, which can reduce or even block the reflected light A, thereby weakening or even blocking the ghosting caused by the reflected light A and the reflected light B. In addition, since the masking layer 140 has a low transmittance for the projection light ray, the masking layer 140 can serve as a display background for the main image, thereby improving the visibility of the main image and the contrast in brightness between the main image and the ambient, and significantly improving the display quality of the main image.

An application scenario of the laminated glass 10 is introduced below. In the case where the laminated glass 10 is applied to a vehicle 1, the laminated glass 10 is mounted to the vehicle 1 at a certain inclination angle to serve as a front windshield. The first transparent substrate 110 of the laminated glass 10 is a substrate exposed to the outside of the vehicle 1. The second transparent substrate 120 is a substrate inside the vehicle 1. To illustrate the beneficial effects in the case where the laminated glass 10 includes the masking layer 140, a case where the laminated glass 10 does not include the masking layer 140 will be described first. The projection device in the vehicle may project the first image P1 onto the laminated glass 10 to form the first image P1 on the second transparent substrate 120. Objects outside the vehicle can also be seen from the inside of the vehicle through the laminated glass 10. The projection device in the vehicle can emit a light ray to project the first image P1 onto the laminated glass 10, where the light ray is incident on the fourth surface 122 to enter the laminated glass 10, where the light ray can be reflected by the fourth surface 122 to form the reflected light B and be reflected by the first surface 111 to form the reflected light A. The reflected light B and the reflected light A do not coincide to generate a reflection ghost. A light ray from an object outside the vehicle can be incident on the first surface 111, enter the laminated glass 10, and then pass through the laminated glass 10 to enter the vehicle to form incident light C. The incident light C may form transmission ghosting due to the inclined mounting and the parallel thickness of the laminated glass 10. The laminated glass 10 in the embodiments of the disclosure includes the masking layer 140, which can reduce or even block the reflected light A and the incident light C, thereby weakening or even blocking the reflection ghosting and the transmission ghosting.

In conclusion, the laminated glass 10 provided in the embodiments of the disclosure has the masking layer 140 located in the light-blocking region R10, which can reduce or even block the reflection ghosting and the transmission ghosting. It can be seen that the laminated glass 10 provided in the embodiments of the disclosure can enhance the quality of the image projected thereon.

Referring to FIG. 1 again, the light-blocking region R10 has the first region R110 located blow the light-transmitting region R20. The first region R110 has one or more first function display regions R111 for displaying of the first image P1. The light-blocking region R10 further has a second region R120 and a third region R130. The second region R120 is located above the light-transmitting region R20. The third region R130 is located at two sides of the light-transmitting region R20. Both the second region R120 and the third region R130 are configured for shielding electronic components or wiring.

It may be noted that the light-blocking region R10 is disposed to surround the light-transmitting region R20. That is, the first region R110, the second region R120, and the third region R130 are located in the light-blocking region R10 and cooperatively surround the light-transmitting region R20.

In the embodiments, the light-blocking region R10 is divided into three regions. The first region R110 has one or more first function display regions R111. In the case where the first region R110 has multiple first function display regions R111, the multiple first function display regions R111 may be arranged separately or formed integrally. Alternatively, some of the multiple first function display regions R111 are arranged separately and the rest of the multiple first function display regions R111 are formed integrally. Each of the first function display regions R111 is used for displaying of a corresponding one first image P1. Optionally, a ratio of a total area of the one or more first function display region R111 to the area of the first region R110 is greater than 10%, achieving better display effects of the first image P1. The second region R120 and the third region R130 on the one hand serve for shielding electronics or wiring mounted in later applications.

Referring to FIG. 4 again, in an embodiment, the first function display region R111 is part of the fourth surface 122, a proportion of S-polarized light in the projection light ray incident ranges from 60% to 100%, and the first function display region R111 has the reflectivity for the projection light ray incident greater than or equal to 8%.

In the embodiments, preferably, the proportion of S-polarized light in the projection light ray is 100%, so that the reflectivity of the first function display region R111 for the projection light ray incident can be further improved, thereby improving the clarity of the first image P1.

Figure 5:
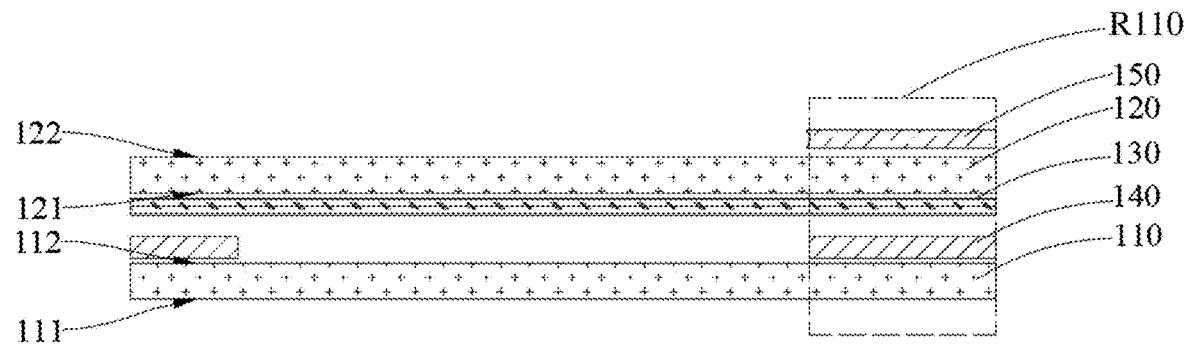
FIG. 5 is an exploded cross-sectional structural view of the laminated glass taken along line I-I of FIG. 1 according to another embodiment of the disclosure.
Figure 6:
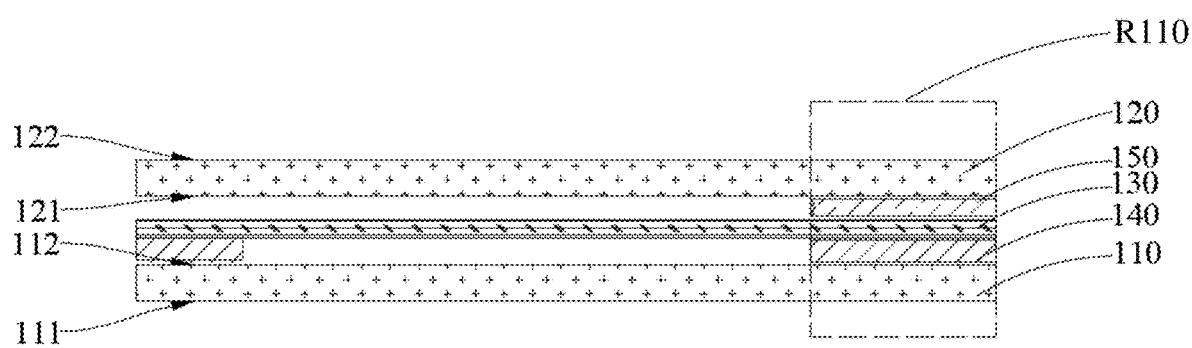
FIG. 6 is an exploded cross-sectional structural view of the laminated glass taken along line I-I of FIG. 1 according to another embodiment of the disclosure.
Figure 7:
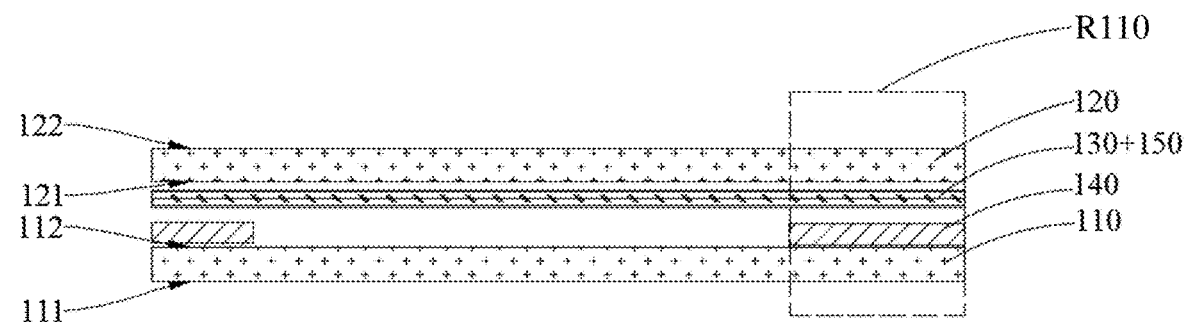
FIG. 7 is an exploded cross-sectional structural view of the laminated glass taken along line I-I of FIG. 1 according to another embodiment of the disclosure.

Referring to FIGS. 5, 6, and 7 together, FIG. 5 is an exploded cross-sectional structural view of the laminated glass 10 taken along line I-I of FIG. 1 according to another embodiment of the disclosure, FIG. 6 is an exploded cross-sectional structural view of the laminated glass 10 taken along line I-I of FIG. 1 according to another embodiment of the disclosure, and FIG. 7 is an exploded cross-sectional structural view of the laminated glass taken along line I-I of FIG. 1 according to another embodiment of the disclosure. The adhesive film 130 is of uniform thickness. The laminated glass 10 further includes a dielectric film 150. The dielectric film 150 may be disposed on the third surface 121 (see FIG. 6). Alternatively, the dielectric film 150 may be disposed on the fourth surface 122 (see FIG. 5). Alternatively, the dielectric film 150 may be wrapped in the adhesive film 130 (see FIG. 7). The dielectric film 150 is located in the first region R110. An orthographic projection of the dielectric film 150 on the second transparent substrate 120 covers all of the first function display regions R111. The dielectric film 150 can reflect S-polarized light.

In the embodiments, the dielectric film 150 can reflect S-polarized light. The dielectric film 150 may be disposed on the fourth surface 122 (see FIG. 5). Alternatively, the dielectric film 150 may be disposed on the third surface 121 (see FIG. 6). Alternatively, the dielectric film 150 may be wrapped in the adhesive film 130 (see FIG. 7). A combination of the second transparent substrate 120 and the dielectric film 150 allows the second transparent substrate 120 to reflect S-polarized light. For example, in the case where a proportion of S-polarized light in the projection light ray incident on one side of the second transparent substrate 120 is relatively large (for example, ranges from 60% to 100%), the second transparent substrate 120 has a relatively high reflectivity for the projection light ray incident on one side of the second transparent substrate 120 in the light-blocking region R10. For example, the second transparent substrate 120 has a reflectivity of 22% for the projection light ray incident at an angle of 60° in the light-blocking region R10. Preferably, a proportion of S-polarized light in the projection light ray is 100%, thereby further weakening or even eliminating light reflected by the first transparent substrate 110. The orthographic projection of the dielectric film 150 on the second transparent substrate 120 covers all of the first function display regions R111, thereby further improving the brightness and clarity of reflection of the second transparent substrate 120 for the light incident on one side of the second transparent substrate 120.

Referring to FIGS. 5, 6, and 7, FIG. 5 is an exploded cross-sectional structural view of the laminated glass taken along line I-I of FIG. 1 according to another embodiment of the disclosure, FIG. 6 is an exploded cross-sectional structural view of the laminated glass taken along line I-I of FIG. 1 according to another embodiment of the disclosure, and FIG. 7 is an exploded cross-sectional structural view of the laminated glass taken along line I-I of FIG. 1 according to another embodiment of the disclosure. The adhesive film 130 is of uniform thickness. The laminated glass 10 further includes the dielectric film 150. The dielectric film 150 may be disposed on the third surface 121 (see FIG. 6). Alternatively, the dielectric film 150 may be disposed on the fourth surface 122 (see FIG. 5). Alternatively, the dielectric film 150 may be wrapped in the adhesive film 130 (see FIG. 7). The dielectric film 150 is located in the first region R110. The orthographic projection of the dielectric film 150 on the second transparent substrate 120 covers all of the first function display regions R111. The dielectric film 150 can reflect P-polarized light.

In the embodiments, the dielectric film 150 can reflect P-polarized light. The dielectric film 150 may be, but is not limited to, a high refractive index layer, a low refractive index layer, a metal film (including one to five silver layers), or a laminated polyethylene terephthalate (PET). The dielectric film 150 may be disposed on the fourth surface 122 (see FIG. 5). Alternatively, the dielectric film 150 may be disposed on the third surface 121 (see FIG. 6). Alternatively, the dielectric film 150 may be wrapped in the adhesive film 130 (see FIG. 7). A combination of the second transparent substrate 120 and the dielectric film 150 allows the second transparent substrate 120 to reflect P-polarized light. For example, in the case where a proportion of P-polarized light in the projection light ray incident on one side of the second transparent substrate 120 is relatively large (for example, ranges from 60% to 100%), the second transparent substrate 120 has a reflectivity for the P-polarized light in the projection light ray incident on one side of the second transparent substrate 120 in the light-blocking region R10. For example, the second transparent substrate 120 has a reflectivity of 20% for the projection light ray incident at an angle of 65° in the light-blocking region R10. Preferably, a proportion of P-polarized light in the projection light ray is 100%, thereby further weakening or even eliminating light reflected by the first transparent substrate 110, and improving the brightness and clarity of reflection of the second transparent substrate 120 for the light incident on one side of the second transparent substrate 120. It is also possible for the driver wearing sunglasses to view the first image P1 in the first function display region R111.

Figure 8:
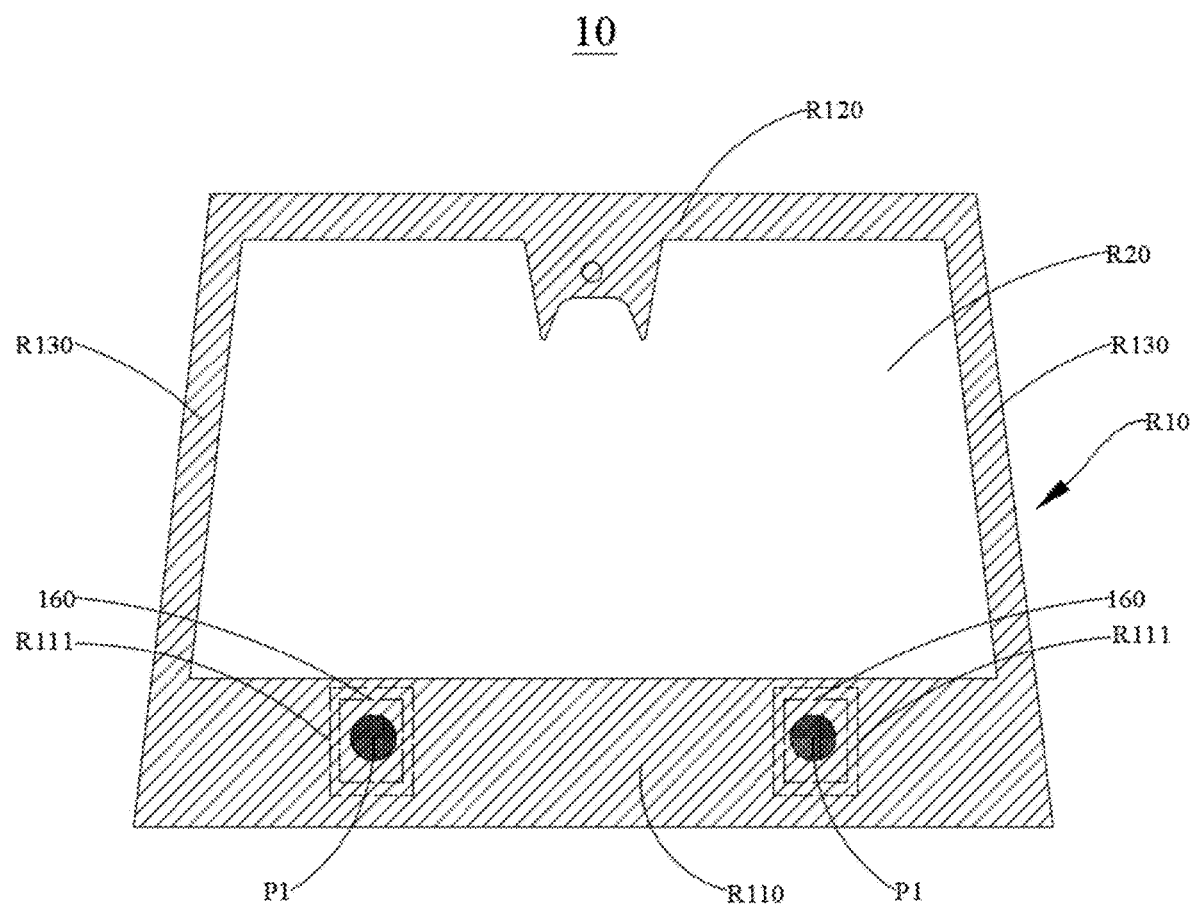
FIG. 8 is a schematic structural view illustrating region division of a laminated glass provided in another embodiment of the disclosure.
Figure 9:
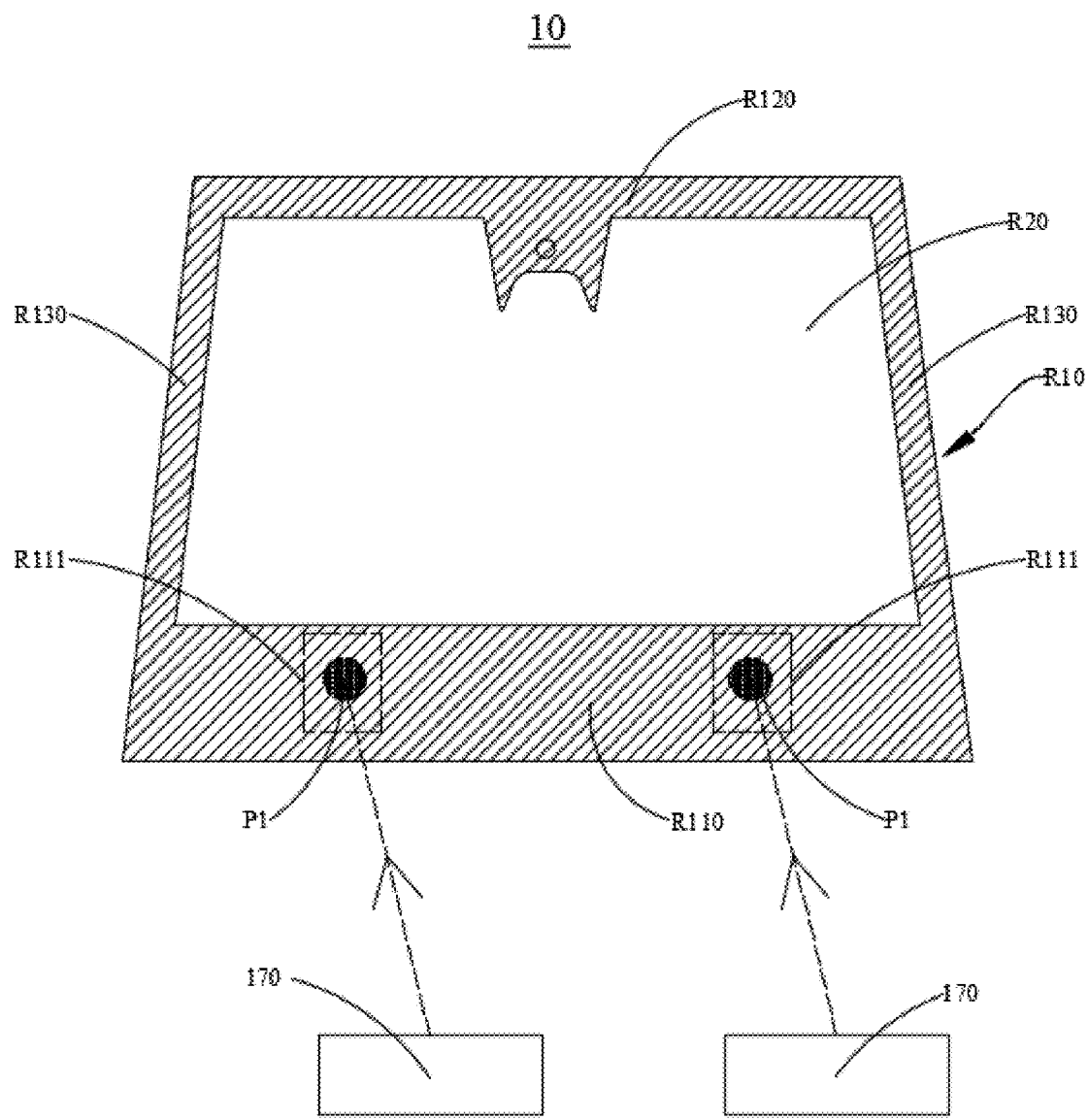
FIG. 9 is a schematic structural view illustrating region division of a laminated glass provided in another embodiment of the disclosure.

Referring to FIGS. 8 and 9, FIG. 8 is a schematic structural view illustrating region division of the laminated glass provided in another embodiment of the disclosure, and FIG. 9 is a schematic structural view illustrating region division of the laminated glass provided in another embodiment of the disclosure. The laminated glass 10 further includes one or more flexible display screens 160. The flexible display screens 160 are located in the first region R110. Each of the one or more flexible display screens 160 is disposed in a corresponding one of the first function display regions R111. The flexible display screen 160 is configured to display the first image P1. Alternatively, the laminated glass 10 further includes one or more first projection light sources 170. The first projection light source 170 is configured to project the first image P1 onto the first function display region R111. Each of the first projection light sources 170 is disposed corresponding to one of the first function display regions R111.

Referring to FIG. 8, in the embodiments, the flexible display screens 160 are disposed in the first function display regions R111. Each of the flexible display screens 160 corresponds to one of the first function display regions R111. Each of the flexible display screens 160 may be disposed between the masking layer 140 and the third surface 121. Alternatively, each of the flexible display screens 160 may be disposed on the fourth surface 122. The flexible display screen 160 may be, but not limited to, a mini light-emitting diode (LED) display screen, a micro LED display screen, or an organic light-emitting diode (OLED) display screen. The flexible display screen 160 can generate an image directly. Light rays emitted by the flexible display screen 160, for forming the first image P1, can directly pass through the second transparent substrate 120 or do not need to pass through the second transparent substrate 120, without being affected by reflection of the first transparent substrate 110, thereby further avoiding ghosting caused by reflection of the first transparent substrate 110 for the light rays emitted and reflection of the second transparent substrate 120 for the light rays emitted.

In another embodiment, referring to FIG. 9, each first projection light source 170 is disposed corresponding to one first function display region R111. The first projection light source 170 is disposed at one side of the second transparent substrate 120. Optionally, a proportion of S-polarized light in light rays emitted by the first projection light source 170 ranges from 60% to 100%. With the aid of the dielectric film 150 that can reflect S-polarized light, the clarity of the first image P1 can be improved. Preferably, the proportion of S-polarized light in the light rays emitted by the first projection light source 170 is 100%, so that the clarity of the first image P1 can be further improved.

In yet another embodiment, in the case where the laminated glass 10 has multiple first function display regions R111, the flexible display screens 160 are used in combination with the first projection light source 170. The flexible display screens 160 are arranged corresponding to some of the first function display regions R111, and the first projection light sources 170 are arranged corresponding to the rest of the first function display regions R111. In the embodiments, it can not only weaken ghosting caused by reflection of the first transparent substrate 110 for the light rays emitted and reflection of the second transparent substrate 120 for the light rays emitted, but also increase the display diversity of the first function display regions R111. As such, mounting of the laminated glass 10 can be optimized according to practical applications.

It may be noted that the flexible display screen 160 or the first function display region R111 is closer to the fourth surface 122 than the masking layer 140, so that the masking layer 140 can serve as the display background of the first image P1. The masking layer 140 may be, but not limited to, a dark ink layer or a colored polymer film. Here, a projection display distance for the first image P1 ranges from 0.5 m to 5 m. In some embodiments, a projection display distance for the first image P1 is a distance between the first projection light source 170 and the first image P1.

Figure 10:
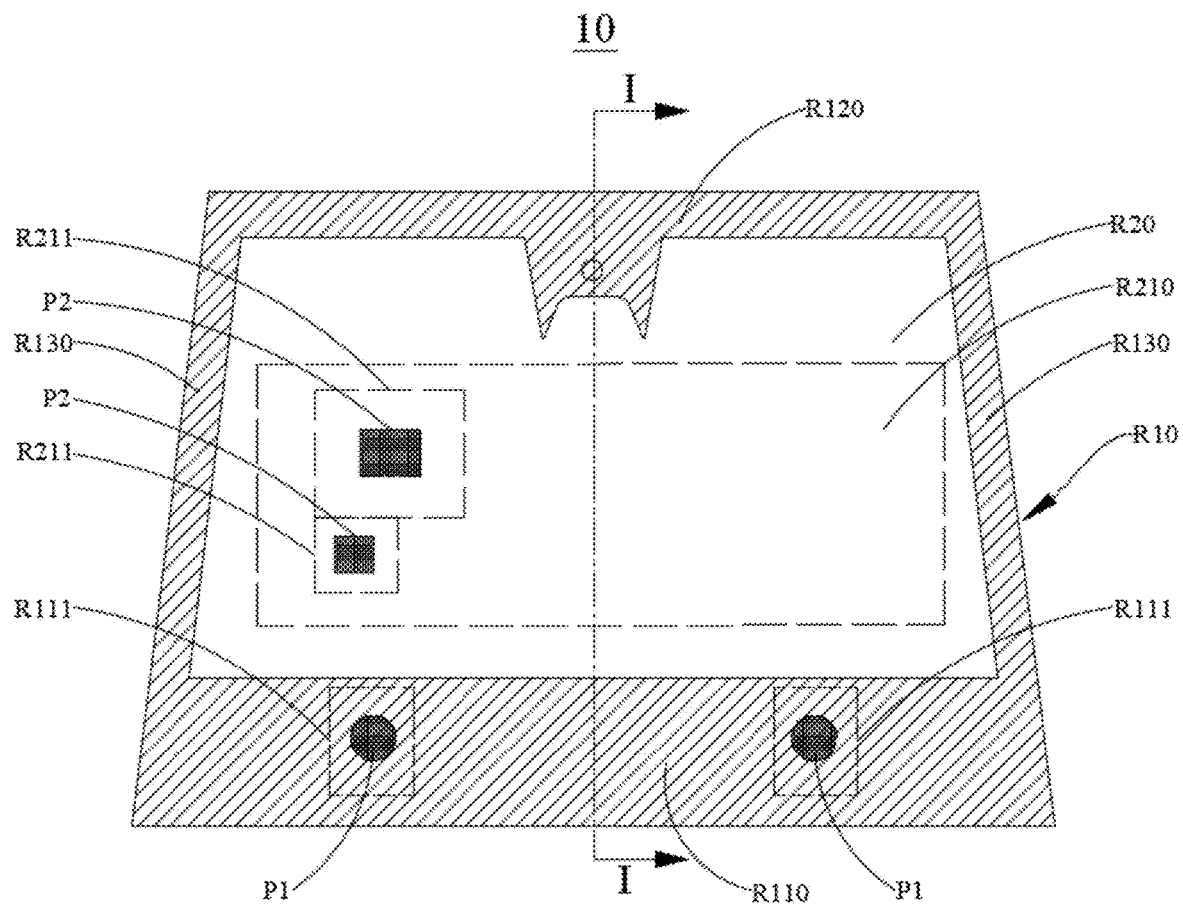
FIG. 10 is a schematic structural view illustrating region division of a laminated glass provided in another embodiment of the disclosure.

Referring to FIG. 10, FIG. 10 is a schematic structural view illustrating region division of the laminated glass provided in another embodiment of the disclosure. The light-transmitting region R20 further includes a primary viewing region R210. A lower boundary of the primary viewing region R210 is at least 25 mm higher than an upper boundary of the first region R110.

In the embodiments, the lower boundary of the primary viewing region R210 is at least 25 mm higher than the upper boundary of the first region R110, so that an optical sensitive zone can be avoided, and optical distortion between the first region R110 and the primary viewing region R210 can be avoided, where the optical distortion may interfere with an imaging in the first region R110 and an imaging in the primary viewing region R210.

Referring to FIG. 10 again, the primary viewing region R210 further has one or more second function display regions R211. The second function display region R211 is configured to display a second image P2. A projection display distance for the second image P2 is greater than or equal to 7.5 m. In some embodiments, a projection display distance for the second image P2 is a distance between a second projection light source 190 and the second image P2.

In the embodiments, the laminated glass 10 further has the second function display region R211. An area of the second function display region R211 is larger than that of the first function display region R111, so that the laminated glass 10 can display the second image P2 larger than the first image P1, thereby enriching the image display of the laminated glass 10. A projection light ray for forming the first image P1 is incident on the first function display region R111 at an angle of 50° to 72°, and the first function display region has a reflectivity, for the projection light ray for forming the first image P1, greater than or equal to 4%. A projection light ray for forming the second image P2 is incident on the second function display region R211 at an angle of 50° to 72°, and the second function display region R211 has a reflectivity, for the projection light ray for forming the second image P2, greater than or equal to 8%.

Figure 11:
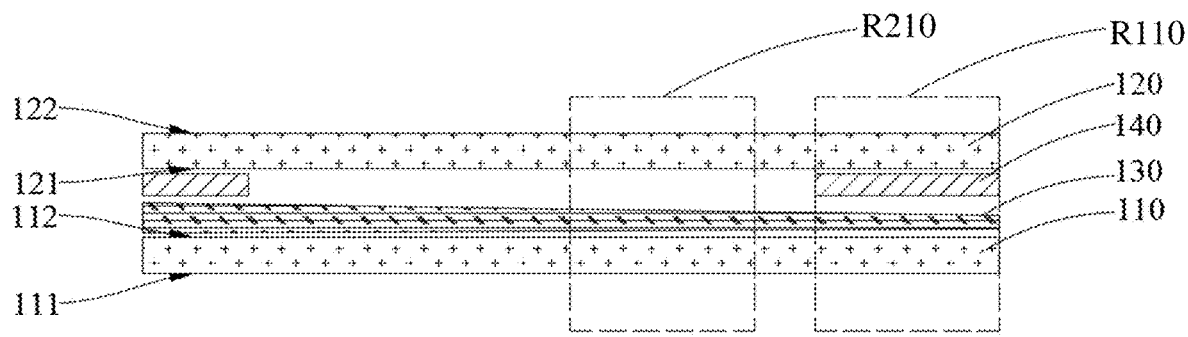
FIG. 11 is an exploded cross-sectional structural view of the laminated glass taken along line I-I of FIG. 10 according to another embodiment of the disclosure.
Figure 12:
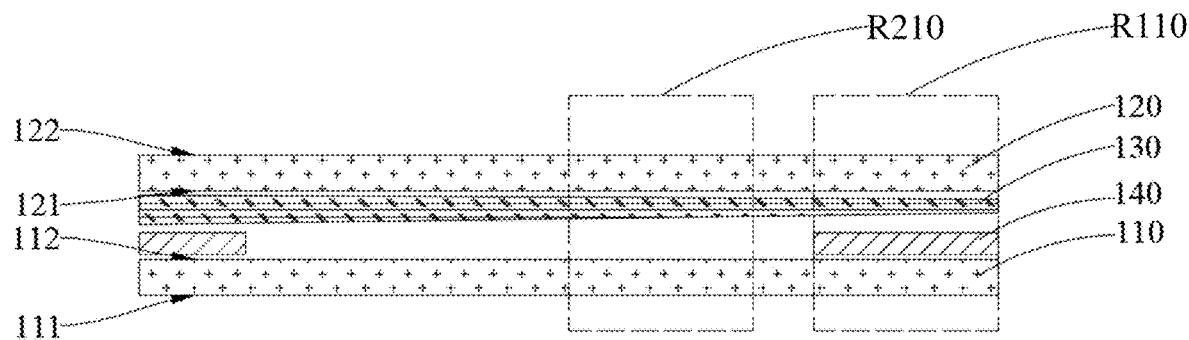
FIG. 12 is an exploded cross-sectional structural view of the laminated glass taken along line I-I of FIG. 10 according to another embodiment of the disclosure.

Referring to FIGS. 11 and 12, FIG. 11 is an exploded cross-sectional structural view of the laminated glass taken along line I-I of FIG. 10 according to another embodiment of the disclosure, and FIG. 12 is an exploded cross-sectional structural view of the laminated glass taken along line I-I of FIG. 10 according to another embodiment of the disclosure.

A thickness of the adhesive film 130 gradually decreases in a direction from the second region R120 to the first region R110. An orthographic projection of the adhesive film 130 on the second transparent substrate 120 covers all of the second function display regions R211.

In the embodiments, the thickness of the adhesive film 130 gradually decreases in the direction from the second region R120 to the first region R110. In other words, the adhesive film 130 is wedge-shaped. Optionally, a wedge-shaped angle caused by a gradual vary in thickness of the adhesive film 130 ranges from 0.15 mrad to 0.55 mrad. An orthographic projection of part of the adhesive film 130, which gradually varies in thickness, on the second transparent substrate 120 covers at least all of the second function display regions R211. The second function display region R211 servers as part of the fourth surface 122. A proportion of S-polarized light in the projection light ray incident for forming the second image P2 ranges from 60% to 100%. The second function display region R211 has a reflectivity greater than or equal to 8% for the projection light ray, for forming the second image P2, incident at an angle of 50° to 72°. Preferably, the proportion of S-polarized light in the projection light ray for forming the second image P2 is 100%. The adhesive film 130 that gradually varies in thickness can correct, by means of a wedge-shaped angle, ghosting in the second function display region R211 caused by reflection of the first transparent substrate 110 for the projection light ray incident and refection of the second transparent substrate 120 for the projection light ray incident. In addition, in the case where the laminated glass 10 has multiple second function display regions R211, wedge-shaped angles of the adhesive film 130 in different second function display regions R211 may be either equal or unequal. Since the second function display regions R211 differ in size, shape, and position, and incident angles of light sources are also different, different wedge-shaped angles are required to correct ghosting in each second function display region R211 caused by reflection of the first transparent substrate 110 for the projection light ray and reflection of the second transparent substrate 120 for the projection light ray. In the case where each of the second function display regions R211 has consistent setting conditions, the same wedge-shaped may also be used.

Referring to FIG. 11, in an embodiment, the masking layer 140 is disposed on the third surface 121. The adhesive film 130 is disposed between the masking layer 140 and the second surface 112. An orthographic projection of part of the adhesive film 130, which gradually varies in thickness, on the second transparent substrate 120 covers all of the second function display regions R211. The adhesive film 130 may correct ghosting in the second function display region R211 caused by reflection of the first transparent substrate 110 for the projection light ray and reflection of the second transparent substrate 120 for the projection light ray, thereby improving the clarity of the second image P2. In another embodiment, referring to FIG. 12, the masking layer 140 is disposed on the second surface 112. The adhesive film 130 is disposed between the masking layer 140 and the third surface 121. An orthographic projection of part of the adhesive film 130, which gradually varies in thickness, on the second transparent substrate 120 covers all of the second function display regions R211. The adhesive film 130 may correct ghosting in the second function display region R211 caused by the reflection of the first transparent substrate 110 for the projection light ray and reflection of the second transparent substrate 120 for the projection light ray, thereby improving the clarity of the second image P2. Alternatively, an orthographic projection of part of the adhesive film 130, which gradually varies in thickness, on the second transparent substrate 120 covers all of the first function display regions R111 and all of the second function display regions R211. The adhesive film 130 may correct ghosting in the first function display region R111, caused by reflection of the first transparent substrate 110 for the projection light ray and reflection of the second transparent substrate 120 for the projection light ray, and ghosting in the second function display region R211, caused by reflection of the first transparent substrate 110 for the projection light ray and reflection of the second transparent substrate 120 for the projection light ray, thereby not only improving the clarity of the second image P2, but also further improving the clarity of the first image P1. Further, the manufacturing efficiency of the adhesive film 130, the first transparent substrate 110, and the second transparent substrate 120 can be improved.

Figure 13:
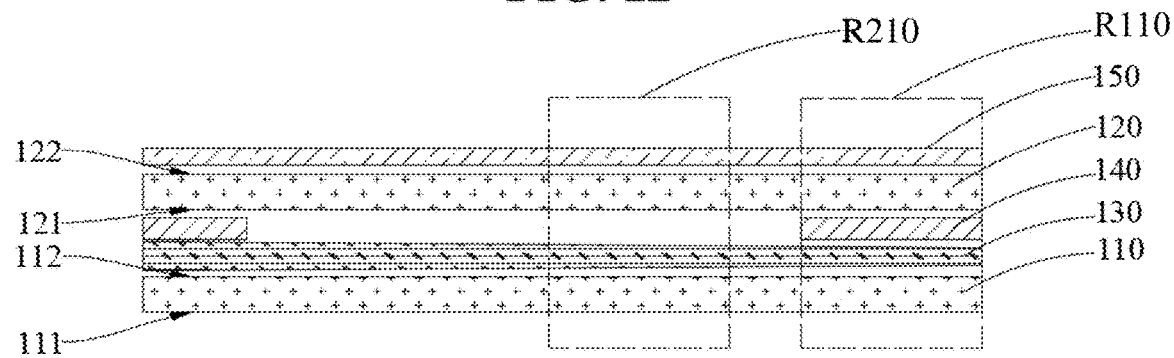
FIG. 13 is an exploded cross-sectional structural view of the laminated glass taken along line I-I of FIG. 10 according to another embodiment of the disclosure.
Figure 14:
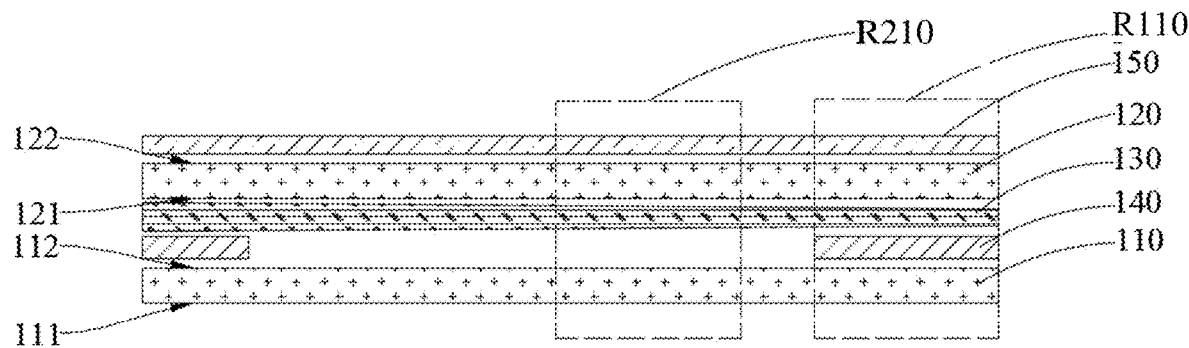
FIG. 14 is an exploded cross-sectional structural view of the laminated glass taken along line I-I of FIG. 10 according to another embodiment of the disclosure.
Figure 15:
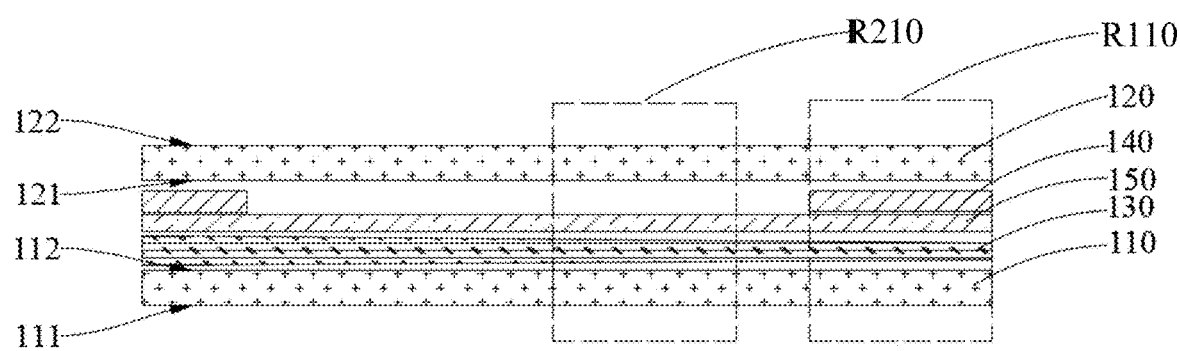
FIG. 15 is an exploded cross-sectional structural view of the laminated glass taken along line I-I of FIG. 10 according to another embodiment of the disclosure.
Figure 16:
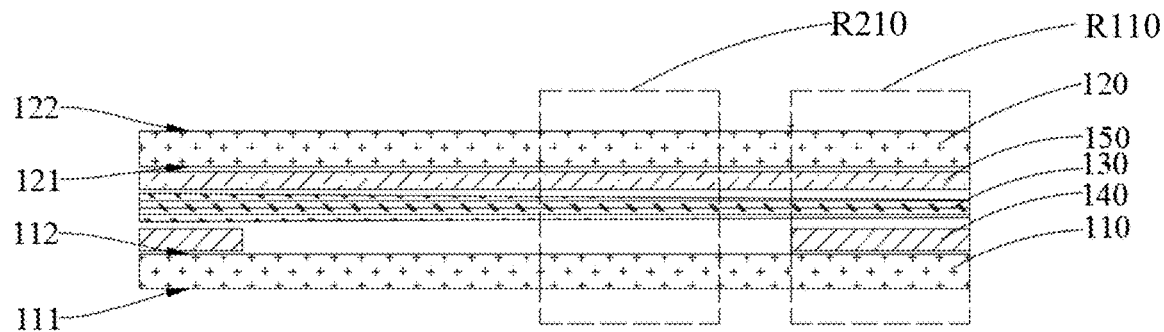
FIG. 16 is an exploded cross-sectional structural view of the laminated glass taken along line I-I of FIG. 10 according to another embodiment of the disclosure.

Referring to FIGS. 13 to 16, FIG. 13 is an exploded cross-sectional structural view of the laminated glass taken along line I-I of FIG. 10 according to another embodiment of the disclosure, FIG. 14 is an exploded cross-sectional structural view of the laminated glass taken along line I-I of FIG. 10 according to another embodiment of the disclosure, FIG. 15 is an exploded cross-sectional structural view of the laminated glass taken along line I-I of FIG. 10 according to another embodiment of the disclosure, and FIG. 16 is an exploded cross-sectional structural view of the laminated glass taken along line I-I of FIG. 10 according to another embodiment of the disclosure. The laminated glass 10 further includes the dielectric film 150 disposed on the third surface 121 or the fourth surface 122. The dielectric film 150 can reflect P-polarized light or S-polarized light. Alternatively, the dielectric film 150 is disposed on the fourth surface 122, and the dielectric film 150 has anti-reflection capability for S-polarized light and a reflectivity for S-polarized light less than 6%. Alternatively, the dielectric film 150 is a laminated structure formed by a high refractive index layer and a low refractive index layer and disposed on the third surface 121 or the fourth surface 122, and can reflect P-polarized light or S-polarized light. Alternatively, the dielectric film 150 includes at least one metal layer (one to five silver layers) and is disposed on the second surface 112 or the third surface 121, and can reflect P-polarized light. Alternatively, the dielectric film 150 is a laminated PET and sandwiched between the second surface 112 and the third surface 121, and can reflect P-polarized light. The orthographic projection of the dielectric film 150 on the second transparent substrate 120 covers at least all of the second function display regions R211. In an embodiment, the orthographic projection of the dielectric film 150 on the second transparent substrate 120 cover all of the second function display regions R211. In another embodiment, the orthographic projection of the dielectric film 150 on the second transparent substrate 120 covers all of the second function display regions R211 and all of the first function display regions R111.

Referring to FIG. 13, on the basis of the embodiment illustrated in FIG. 11, the dielectric film 150 is disposed on the fourth surface 122. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. The first surface 111 of the first transparent substrate 110 has a very low reflectivity for P-polarized light incident at an angle of 50° to 72°. For example, the first surface 111 has a reflectivity for P-polarized light incident at an angle of 57° less than 1%, so that reflection of the first surface 111 for the light ray emitted can be weakened, that is, ghosting caused by reflection of the first surface 111 and reflection of the fourth surface 122, for the light ray emitted by the light source at one side of the fourth surface 122, can be further weakened. In another embodiment, in the case where a proportion of S-polarized light in a light ray emitted by the light source at one side of the fourth surface 122 ranges from 60% to 100%, the dielectric film 150 can reflect S-polarized light and have a reflectivity for S-polarized light not less than 28%, thereby weakening reflection of the first surface 111 for the light ray emitted by the light source. In addition, with the aid of the adhesive film 130 that varies in thicknesses, image superposing between reflection of the first surface 111 and reflection of the fourth surface 122, for the light ray emitted by the light source at one side of the fourth surface 122, can be strengthened, that is, ghosting caused by reflection of the first surface 111 and reflection of the fourth surface 122, for the light ray emitted by the light source at one side of the fourth surface 122, can be weakened. In a further embodiment, in the case where a proportion of S-polarized light in the light ray emitted by the light source at one side of the fourth surface 122 ranges from 60% to 100%, the orthographic projection of the dielectric film 150 on the second transparent substrate 120 does not cover all of the first function display regions R111, the dielectric film 150 has anti-reflection capability for S-polarized light and a reflectivity for S-polarized light of not greater than 6%, so that reflection of the fourth surface 122 for the light ray emitted by the light source at one side of the fourth surface 122 can be weakened, thereby weakening ghosting caused by reflection of the first surface 111 and reflection of the fourth surface 122 for the light ray emitted by the light source at one side of the fourth surface 122.

Referring to FIG. 14, on the basis of the embodiment illustrated in FIG. 12, the dielectric film 150 is disposed on the fourth surface 122. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. The first surface 111 of the first transparent substrate 110 has a very low reflectivity for P-polarized light incident at an angle of 50° to 72°. For example, the first surface 111 has a reflectivity for P-polarized light incident at an angle of 57° less than 1%, so that reflection of the first surface 111 for the light ray emitted can be weakened, that is, ghosting caused by reflection of the first surface 111 and reflection of the fourth surface 122, for a light ray emitted by the light source at one side of the fourth surface 122, can be weakened. In another embodiment, in the case where a proportion of S-polarized light in a light ray emitted by the light source at one side of the fourth surface 122 ranges from 60% to 100%, the dielectric film 150 can reflect S-polarized light and have a reflectivity for S-polarized light not less than 28%, thereby weakening reflection of the first surface 111 for the light ray emitted by the light source. In addition, with the aid of the adhesive film 130 that varies in thicknesses, image superposing between reflection of the first surface 111 and reflection of the fourth surface 122, for the light ray emitted by the light source at one side of the fourth surface 122, can be strengthened, that is, ghosting caused by reflection of the first surface 111 and reflection of the fourth surface 122, for the light ray emitted by the light source at one side of the fourth surface 122, can be weakened. In a further embodiment, in the case where a proportion of S-polarized light in the light ray emitted by the light source at one side of the fourth surface 122 ranges from 60% to 100%, the orthographic projection of the dielectric film 150 on the second transparent substrate 120 does not cover all of the first function display regions R111, the dielectric film 150 has anti-reflection capability for S-polarized light and a reflectivity for S-polarized light of not greater than 6%, so that reflection of the fourth surface 122 for the light ray emitted by the light source at one side of the fourth surface 122 can be weakened, thereby weakening ghosting caused by reflection of the first surface 111 and reflection of the fourth surface 122 for the light ray emitted by the light source at one side of the fourth surface 122.

Referring to FIG. 15, on the basis of the embodiment illustrated in FIG. 11, the dielectric film 150 is disposed between the masking layer 140 and the adhesive film 130. The orthographic projection of the dielectric film 150 on the second transparent substrate 120 covers all of the second function display regions R211. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. Each of the first surface 111 of the first transparent substrate 110 and the fourth surface 122 of the second transparent substrate 120 has a very low reflectivity for P-polarized light incident at an angle of 50° to 72°. For example, each of the first surface 111 and the fourth surface 122 has a reflectivity for P-polarized light incident at an angle of 57° less than 1%, so that reflection of the first surface 111 for the light ray emitted and the reflection of the fourth surface 111 for the light ray emitted can be weakened, that is, ghosting caused by reflection of the first surface 111 and reflection of the fourth surface 122, for the light ray emitted by the light source at one side of the fourth surface 122, can be weakened.

Referring to FIG. 16, on the basis of the embodiment illustrated in FIG. 12, the dielectric film 150 is disposed between the adhesive film 130 and the third surface 121. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%, so that reflection of the first surface 111 for the light ray emitted can be weakened, that is, ghosting caused by reflection of the first surface 111 and reflection of the fourth surface 122, for the light ray emitted by the light source at one side of the fourth surface 122, can be weakened.

Figure 17:
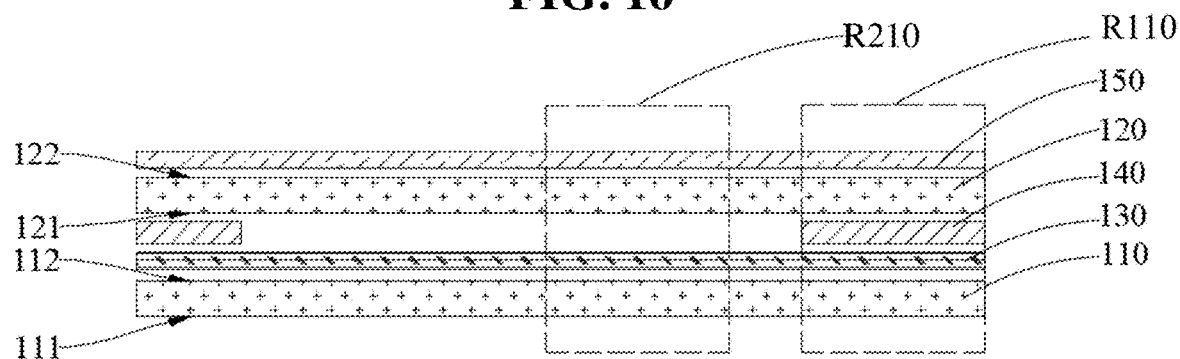
FIG. 17 is an exploded cross-sectional structural view of the laminated glass taken along line I-I of FIG. 10 according to another embodiment of the disclosure.
Figure 18:
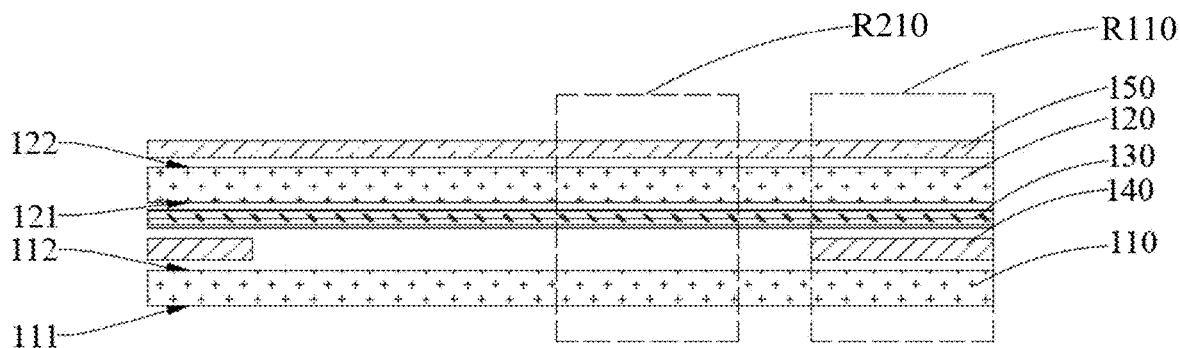
FIG. 18 is an exploded cross-sectional structural view of the laminated glass taken along line I-I of FIG. 10 according to another embodiment of the disclosure.
Figure 19:
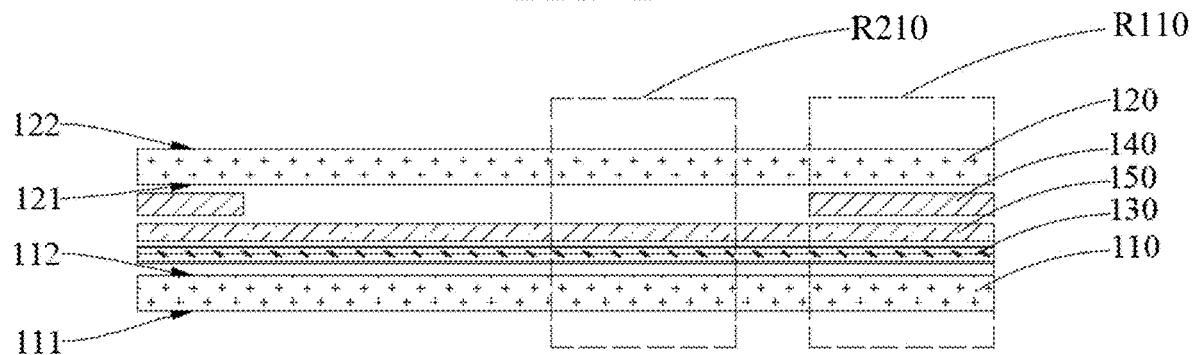
FIG. 19 is an exploded cross-sectional structural view of the laminated glass taken along line I-I of FIG. 10 according to another embodiment of the disclosure.
Figure 20:
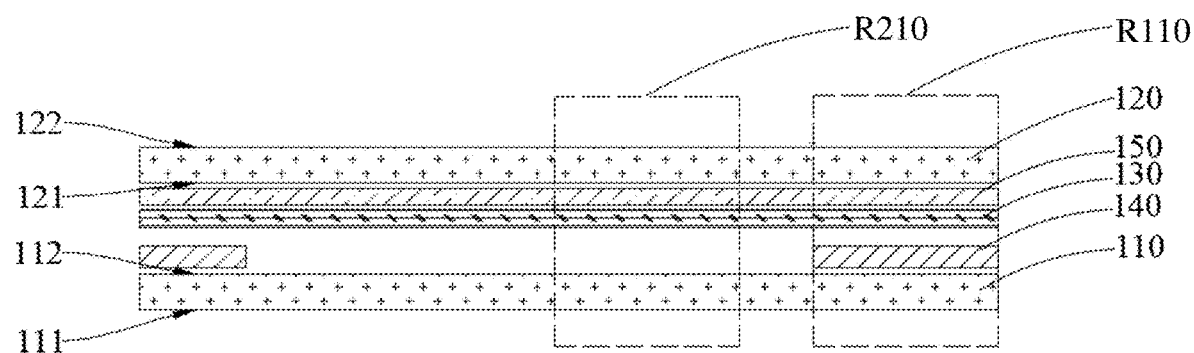
FIG. 20 is an exploded cross-sectional structural view of the laminated glass taken along line I-I of FIG. 10 according to another embodiment of the disclosure.
Figure 21:
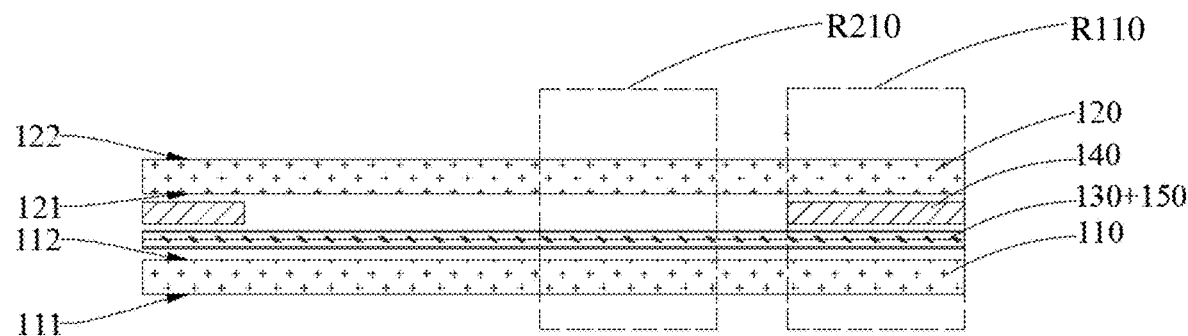
FIG. 21 is an exploded cross-sectional structural view of the laminated glass taken along line I-I of FIG. 10 according to another embodiment of the disclosure.
Figure 22:
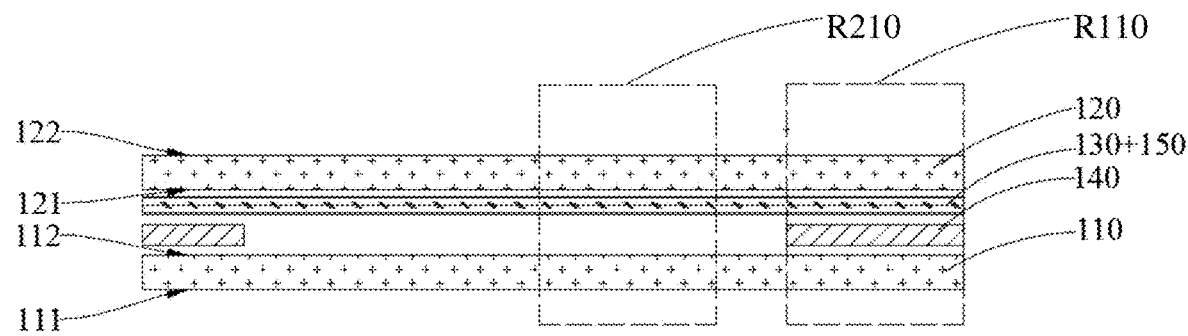
FIG. 22 is an exploded cross-sectional structural view of the laminated glass taken along line I-I of FIG. 10 according to another embodiment of the disclosure.

Referring to FIGS. 17 to 22, FIG. 17 is an exploded cross-sectional structural view of the laminated glass taken along line I-I of FIG. 10 according to another embodiment of the disclosure, FIG. 18 is an exploded cross-sectional structural view of the laminated glass taken along line I-I of FIG. 10 according to another embodiment of the disclosure, FIG. 19 is an exploded cross-sectional structural view of the laminated glass taken along line I-I of FIG. 10 according to another embodiment of the disclosure, FIG. 20 is an exploded cross-sectional structural view of the laminated glass taken along line I-I of FIG. 10 according to another embodiment of the disclosure, FIG. 21 is an exploded cross-sectional structural view of the laminated glass taken along line I-I of FIG. 10 according to another embodiment of the disclosure, and FIG. 22 is an exploded cross-sectional structural view of the laminated glass taken along line I-I of FIG. 10 according to another embodiment of the disclosure. The adhesive film 130 is of uniform thickness. The laminated glass 10 further includes the dielectric film 150. The dielectric film 150 may be disposed on the third surface 121. Alternatively, the dielectric film 150 may be disposed on the fourth surface 122. Alternatively, the dielectric film 150 may be wrapped in the adhesive film 130. The dielectric film 150 can reflect P-polarized light. Alternatively, the dielectric film 150 can reflect polarized light and have a reflectivity for polarized light less than 6%. An orthographic projection of the dielectric film 150 on the second transparent substrate 120 covers at least all of the second function display regions R211.

Referring to FIG. 17, on the basis of the embodiment illustrated in FIG. 4, the dielectric film 150 is disposed on the fourth surface 122. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. The first surface 111 of the first transparent substrate 110 has a very low reflectivity for P-polarized light incident at an angle of 50° to 72°. For example, the first surface 111 has a reflectivity for P-polarized light incident at an angle of 57° less than 1%, so that reflection of the first surface 111 for the light ray emitted can be weakened, that is, ghosting caused by reflection of the first surface 111 and reflection of the fourth surface 122, for the light ray emitted by the light source at one side of the fourth surface 122, can be weakened. In another embodiment, in the case where a proportion of S-polarized light in the light ray emitted by the light source at one side of the fourth surface 122 ranges from 60% to 100%, the orthographic projection of the dielectric film 150 on the second transparent substrate 120 only covers all of the first function display regions R111, the dielectric film 150 has anti-reflection capability for S-polarized light and a reflectivity for S-polarized light of not greater than 6%, so that reflection of the fourth surface 122 for the light ray emitted by the light source at one side of the fourth surface 122 can be weakened, thereby weakening ghosting caused by reflection of the first surface 111 and reflection of the fourth surface 122 for the light ray emitted by the light source at one side of the fourth surface 122.

Referring to FIG. 18, on the basis of the embodiment illustrated in FIG. 3, the dielectric film 150 is disposed on the fourth surface 122. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. The first surface 111 of the first transparent substrate 110 has a very low reflectivity for P-polarized light incident at an angle of 50° to 72°. For example, the first surface 111 has a reflectivity for P-polarized light incident at an angle of 57° less than 1%, so that reflection of the first surface 111 for the light ray emitted can be weakened, that is, ghosting caused by reflection of the first surface 111 and reflection of the fourth surface 122, for a light ray emitted by the light source at one side of the fourth surface 122, can be weakened. In another embodiment, in the case where a proportion of S-polarized light in the light ray emitted by the light source at one side of the fourth surface 122 ranges from 60% to 100%, the orthographic projection of the dielectric film 150 on the second transparent substrate 120 does not cover all of the first function display regions R111, the dielectric film 150 has anti-reflection capability for S-polarized light and a reflectivity for S-polarized light of not greater than 6%, so that reflection of the fourth surface 122 for the light ray emitted by the light source at one side of the fourth surface 122 can be weakened, thereby weakening ghosting caused by reflection of the first surface 111 and reflection of the fourth surface 122 for the light ray emitted by the light source at one side of the fourth surface 122.

Referring to FIG. 19, on the basis of the embodiment illustrated in FIG. 4, the dielectric film 150 is disposed between the adhesive film 130 and the masking layer 140. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. Each of the first surface 111 of the first transparent substrate 110 and the fourth surface 122 of the second transparent substrate 120 has a very low reflectivity for P-polarized light incident at an angle of 50° to 72°. For example, each of the first surface 111 and the fourth surface 122 has a reflectivity for P-polarized light incident at an angle of 57° less than 1%, so that reflection of the first surface 111 for the light ray emitted and the reflection of the fourth surface 111 for the light ray emitted can be weakened, that is, ghosting caused by reflection of the first surface 111 and reflection of the fourth surface 122, for the light ray emitted by the light source at one side of the fourth surface 122, can be weakened.

Referring to FIG. 20, on the basis of the embodiment illustrated in FIG. 3, the dielectric film 150 is disposed between the adhesive film 130 and the third surface 121. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. Each of the first surface 111 of the first transparent substrate 110 and the fourth surface 122 of the second transparent substrate 120 has a very low reflectivity for P-polarized light incident at an angle of 50° to 72°. For example, each of the first surface 111 and the fourth surface 122 has a reflectivity for P-polarized light incident at an angle of 57° less than 1%, so that reflection of the first surface 111 for the light ray emitted and the reflection of the fourth surface 111 for the light ray emitted can be weakened, that is, ghosting caused by reflection of the first surface 111 and reflection of the fourth surface 122, for the light ray emitted by the light source at one side of the fourth surface 122, can be weakened.

Referring to FIG. 21, on the basis of the embodiment illustrated in FIG. 4, the dielectric film 150 is disposed in the adhesive film 130, so that the dielectric film 150 can be wrapped in the adhesive film 130. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. Each of the first surface 111 of the first transparent substrate 110 and the fourth surface 122 of the second transparent substrate 120 has a very low reflectivity for P-polarized light incident at an angle of 50° to 72°. For example, each of the first surface 111 and the fourth surface 122 has a reflectivity for P-polarized light incident at an angle of 57° less than 1%, so that reflection of the first surface 111 for the light ray emitted and the reflection of the fourth surface 111 for the light ray emitted can be weakened, that is, ghosting caused by reflection of the first surface 111 and reflection of the fourth surface 122, for the light ray emitted by the light source at one side of the fourth surface 122, can be weakened.

Referring to FIG. 22, on the basis of the embodiment illustrated in FIG. 3, the dielectric film 150 is disposed in the adhesive film 130, so that the dielectric film 150 can be wrapped in the adhesive film 130. In an embodiment, in the case where a proportion of P-polarized light in a light ray emitted by a light source at one side of the fourth surface 122 ranges from 60% to 100%, the dielectric film 150 can reflect P-polarized light and have a reflectivity for P-polarized light greater than 10%. Each of the first surface 111 of the first transparent substrate 110 and the fourth surface 122 of the second transparent substrate 120 has a very low reflectivity for P-polarized light incident at an angle of 50° to 72°. For example, each of the first surface 111 and the fourth surface 122 has a reflectivity for P-polarized light incident at an angle of 57° less than 1%, so that reflection of the first surface 111 for the light ray emitted and the reflection of the fourth surface 111 for the light ray emitted can be weakened, that is, ghosting caused by reflection of the first surface 111 and reflection of the fourth surface 122, for the light ray emitted by the light source at one side of the fourth surface 122, can be weakened.

Figure 23:
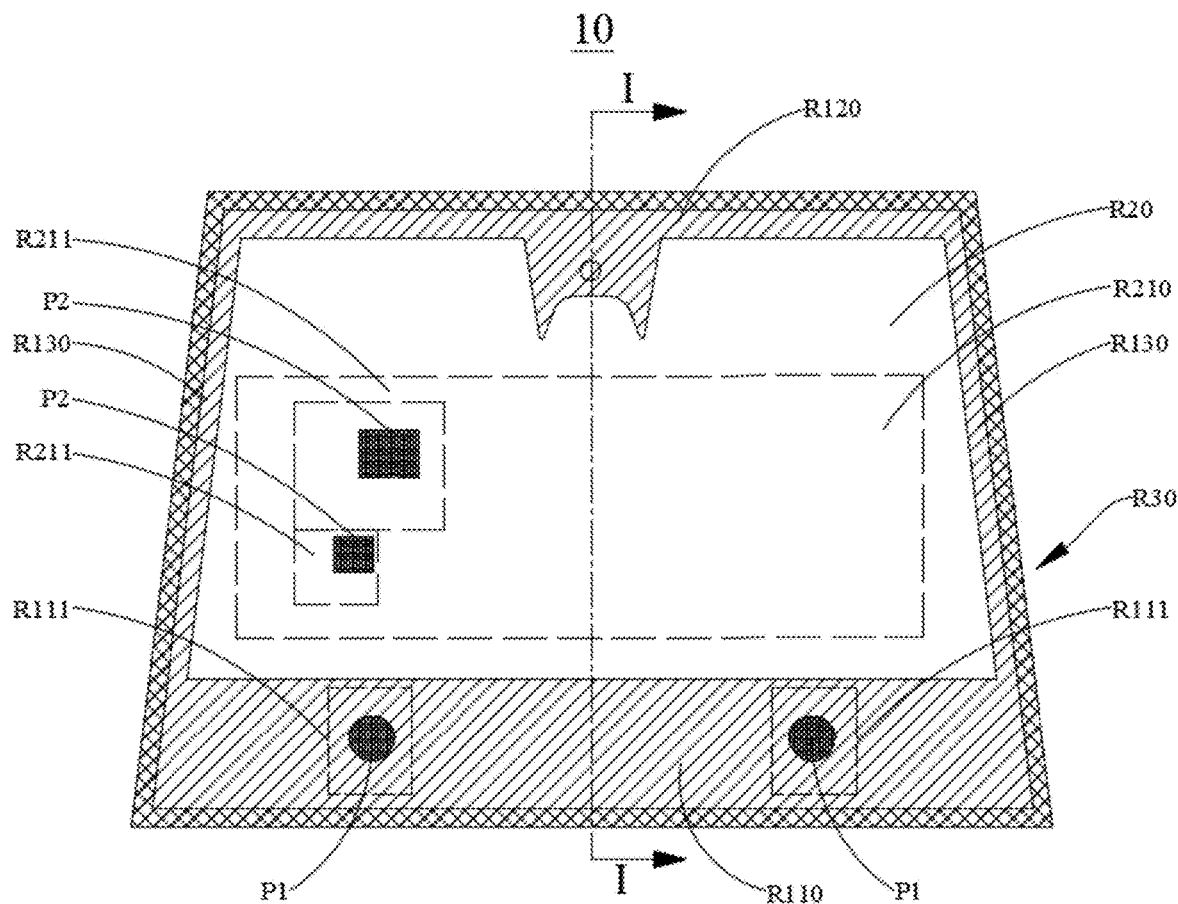
FIG. 23 is a schematic structural view illustrating region division of a laminated glass provided in another embodiment of the disclosure.
Figure 24:
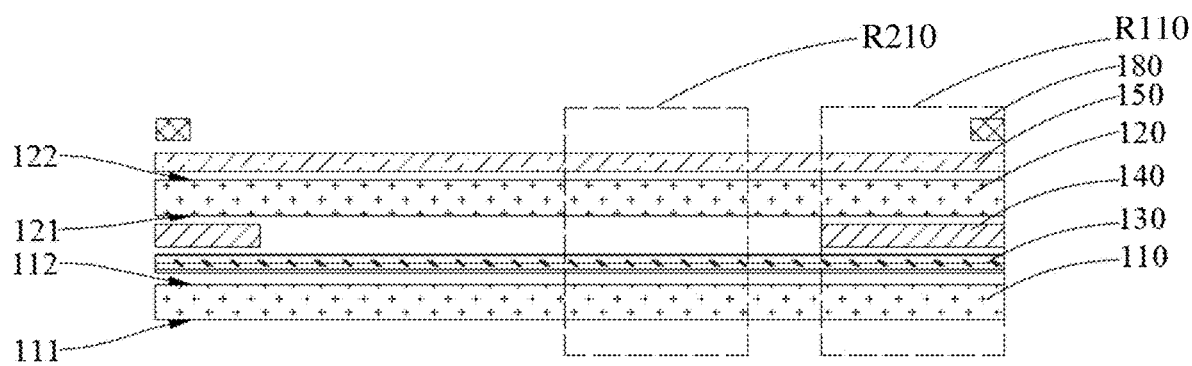
FIG. 24 is an exploded cross-sectional structural view of the laminated glass taken along line I-I of FIG. 23 according to another embodiment of the disclosure.

Referring to FIGS. 23 and 24, FIG. 23 is a schematic structural view illustrating region division of the laminated glass 10 provided in another embodiment of the disclosure, and FIG. 24 is an exploded cross-sectional structural view of the laminated glass 10 taken along line I-I of FIG. 23 according to another embodiment of the disclosure. The laminated glass 10 further includes a colored region R30. The colored region R30 is located at one side of the light-blocking region R10 away from the light-transmitting region R20. The laminated glass 10 further includes a colored layer 180 carried on the second transparent substrate 120. The colored layer 180 is located in the colored region R30. The colored layer 180 is used for alignment and vehicle window fixing during mounting of the laminated glass 10, or disposed on a surface of an adhesive substrate of a fixing member.

In the embodiments, the colored layer 180 is disposed on an outermost surface of the laminated glass 10 and at one side of the fourth surface 122. An orthographic projection of the colored layer 180 on the second transparent substrate 120 covers the colored region R30. The colored region R30 can be configured to shield electronic components or wiring mounted later, and can also be configured to assist in mounting of the laminated glass 10 onto other devices. For example, the colored region R30 facilitates gluing, aligning, or enhancement in adhesive strength. Furthermore, the upper boundary of the first region R110 is higher than an upper boundary of the colored region R30 in the first region R110. Optionally, the upper boundary of the first region R110 is at least 80 mm higher than the upper boundary of the colored region R30 in the first region R110, so that sufficient space is reserved for the first function display region R111.

Figure 25:
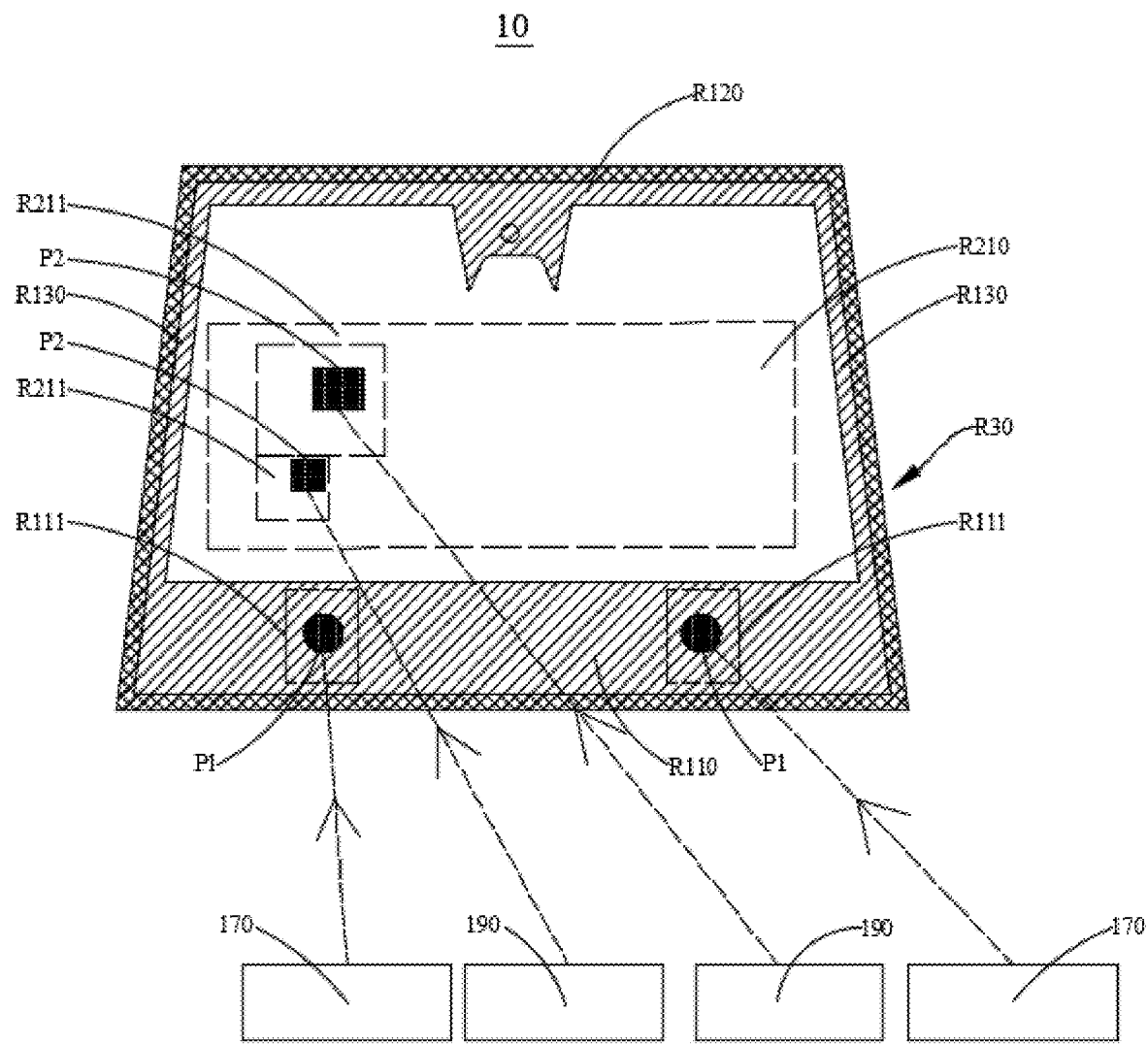
FIG. 25 is a schematic structural view illustrating region division of a laminated glass provided in another embodiment of the disclosure.

Referring to FIG. 25, FIG. 25 is a schematic structural view illustrating region division of the laminated glass provided in another embodiment of the disclosure. The laminated glass 10 further includes one or more first projection light sources 170 and one or more second projection light sources 190. The first projection light source 170 is configured to project the first image P1 to the first function display region R111. Each of the first projection light sources 170 corresponds to one of the first function display regions R111. The second projection light source 190 is configured to project the second image P2 to the second function display region R211. Each of the second projection light sources 190 corresponds to one of the second function display regions R211.

In the embodiments, the second projection light source 190 is configured to project an image to the second function display region R211, so that the second image P2 which has a larger size can be presented, thereby increasing the display diversity of the laminated glass 10.

Figure 26:
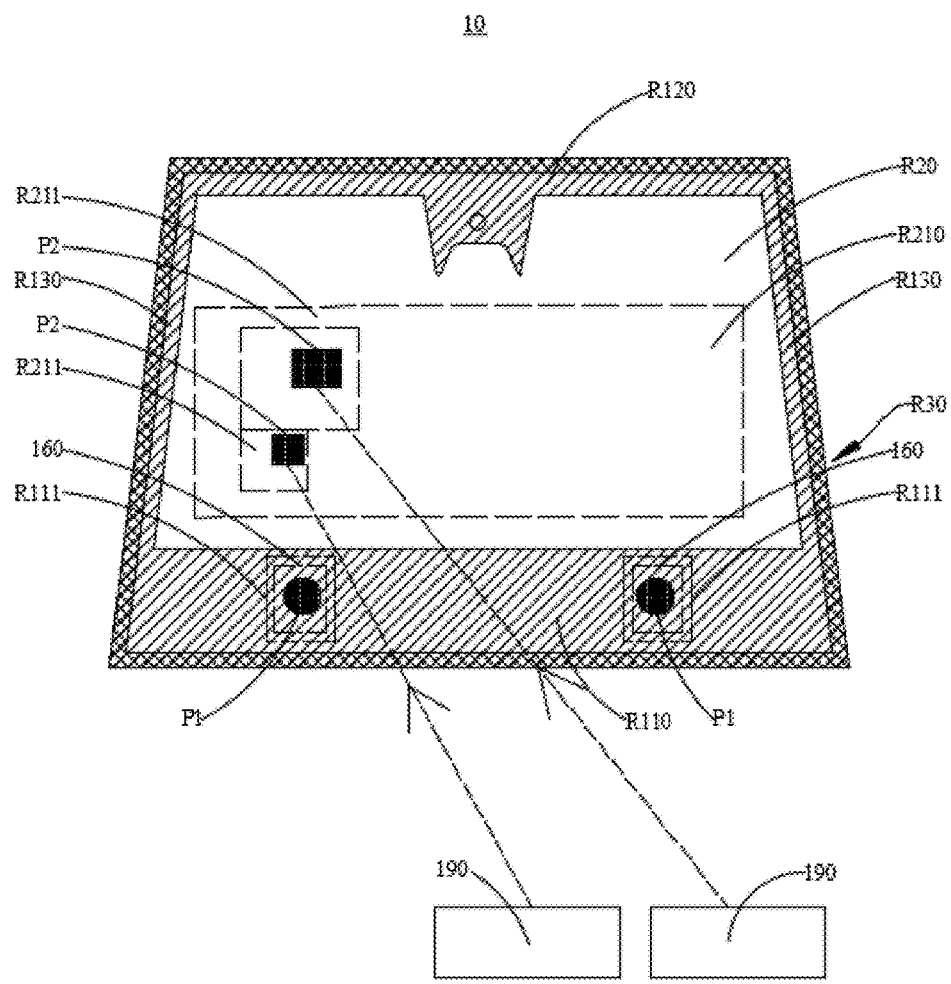
FIG. 26 is a schematic structural view illustrating region division of a laminated glass provided in another embodiment of the disclosure.

Referring to FIG. 26, FIG. 26 is a schematic structural view illustrating region division of the laminated glass provided in another embodiment of the disclosure. The laminated glass 10 further includes one or more flexible display screens 160 and one or more second projection light sources 190. The flexible display screens 160 are arranged in the first region R110. Each of the flexible display screens 160 is disposed corresponding to one of the first function display regions R111. The flexible display screen 160 is configured to display the first image P1. The second projection light source 190 is configured to project the second image P2 onto the second function display region R211. Each of the one or more second projection light sources 190 is disposed corresponding to one of the second function display regions R211.

In the embodiments, the second projection light source 190 is configured to project image onto the second function display region R211, so that the second image P2 which has a larger size can be presented, thereby increasing the display diversity of the laminated glass 10.

A head-up display system is provided in the disclosure. In an embodiment (as illustrated in FIG. 9), the head-up display system includes the first projection light source 170 and the laminated glass 10 described in any one of embodiments where only the first function display region R111 is provided. In another embodiment (as illustrated in FIG. 25), the head-up system includes the first projection light source 170, the second projection light source 190, and the laminated glass 10 described in any one of embodiments where the second function display region R211 is provided.

In an embodiment, a proportion of P-polarized light in the projection light ray for forming the first image P1 ranges from 60% to 100%, and a proportion of S-polarized light in the projection light ray for forming the second image P2 ranges from 60% to 100%.

In another embodiment, a proportion of S-polarized light in the projection light ray for forming the first image P1 ranges from 60% to 100%, and a proportion of P-polarized light in the projection light ray for forming the second image P2 ranges from 60% to 100%.

In a further embodiment, a proportion of P-polarized light in the projection light ray for forming the first image P1 ranges from 60% to 100%, and a proportion of P-polarized light in the projection light ray for forming the second image P2 ranges from 60% to 100%.

In a further embodiment, a proportion of S-polarized light in the projection light ray for forming the first image P1 ranges from 60% to 100%, and a proportion of S-polarized light in the projection light ray for forming the second image P2 ranges from 60% to 100%.

It may be noted that, preferably, a proportion of S-polarized light in the projection light ray is 100%, or proportion of P-polarized light in the projection light ray is 100%, thereby achieving a better projection effect.

Figure 27:
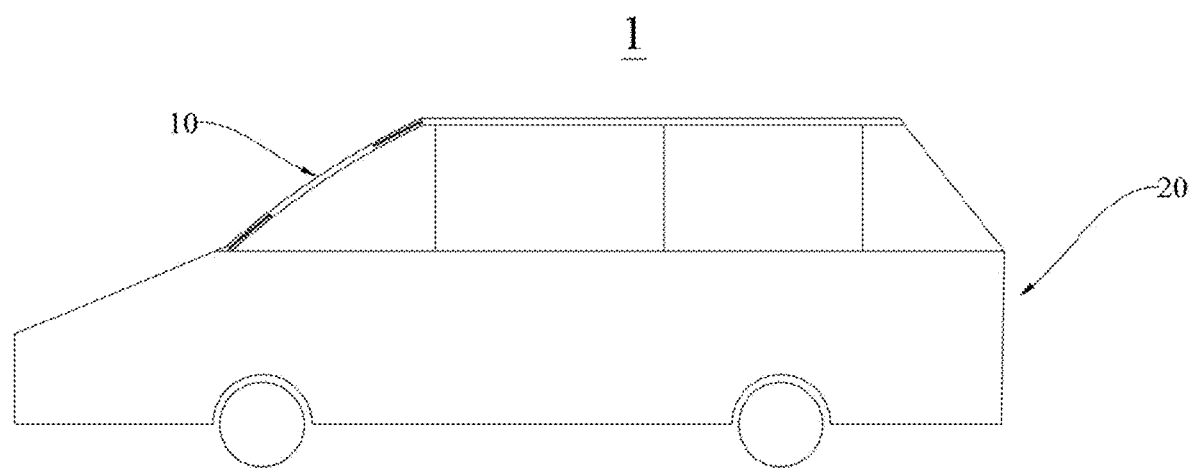
FIG. 27 is a schematic view of a vehicle provided in the disclosure.

Referring to FIG. 27, FIG. 27 is a schematic view of a vehicle provided the disclosure. The vehicle 1 is further provided in the disclosure. The vehicle 1 includes the laminated glass 10 described in any one of the above embodiments. The vehicle 1 further includes a vehicle body 20. The laminated glass 10 is disposed on the vehicle body 20. For the laminated glass 10, reference may be made to the foregoing illustrations, and details are not repeated herein. In the case where the laminated glass 10 is applied to the vehicle 1, the first transparent substrate 110 is disposed on an outer side of the vehicle 1, and the second transparent substrate 120 is disposed on an inner side of the vehicle 1.

In the embodiments, the vehicle 1 may be, but is not limited to, cars, multi-purpose automobiles (MPV), sports/suburban utility vehicles (SUV), off-road automobiles (ORV), pick-and-place automobiles, passenger cars, cargo cars, and the like. An included angle between the laminated glass 10 and the vertical plane is referred to as a mounting angle, and typically ranges from 50° to 72°. In the case where no masking layer 140 is provided in the laminated glass 10, two instances of ghosting occur. On the one hand, projection light rays emitted from the interior of the vehicle 1 will be reflected by the first transparent substrate 110 and the second transparent substrate 120 to cause ghosting. On the other hand, ghosting may further be caused by light rays passing through the laminated glass 1 from objects outside the vehicle 1, and reflected light formed by refection of the laminated glass 10 for the projection light rays emitted from the interior of the vehicle 1. With the aid of the masking layer 140, the above ghosting can be weakened or even eliminated. With the aid of the dielectric film 150, the above ghosting can be further weakened or even eliminated, and ghosting in the second function region R211 can be weakened or even eliminated. In the case where the mounting angle is 60°, experiments are conducted on reflection of the dielectric film 150, with light-transmitting capabilities, for projection light rays in the first function display region R111. The obtained data is presented in the following two tables.

TABLE 1 reflection data of the laminated glass without a transparent dielectric film for projection light rays in the first function display region of the light-blocking region

| Light Source Type | Reflectivity |
| --- | --- |
| Ordinary Light Source | 7.5% |
| P-polarized Light | 0.3% |
| S-polarized Light | 13% |

TABLE 2 reflection data of the laminated glass with different transparent dielectric films for projection light rays in the first function display region

| Transparent dielectric film Type | Light Source Type | Reflectivity |
| --- | --- | --- |
| Anti-reflective film | Ordinary Light Source | 5.1% |
| P-polarized Reflective film | P-polarized Light | 11% |
| S-polarized Reflective film | S-polarized Light | 22% |

In Table 1, in the case where the light source type is an ordinary light source, light emitted by the ordinary light source is an irregular collection of countless polarized lights, so when directly observed, it is impossible to determine which direction the light intensity is biased towards. This type of light, where the intensity of the light waves vibrating in various directions is equal, is also known as natural light. In the case where the light source type is P-polarized light, a proportion of P-polarized light in light rays emitted by the light source ranges from 60% to 100%. In the case where the light source type is S-polarized light, a proportion of S-polarized light in light rays emitted by the light source ranges from 60% to 100%. The light source type in Table 2 can refer to the illustration of the light source type in Table 1, and will not be repeated herein. The anti-reflective film is the afore-mentioned dielectric film 150 which has anti-reflection capability for S-polarized light and a relatively low reflectivity for S-polarized light (of not greater than 6%). The P-polarized reflective film is the afore-mentioned dielectric film 150 which can reflect P-polarized light. The S-polarized reflective film is the afore-mentioned dielectric film 150 which can reflect S-polarized light. The following can be seen from the experimental data in the above two tables. In an embodiment, in the first function display region R111, in the case where the first projection light source 170 is the ordinary light source and the anti-reflective film is mounted, a reflectivity of the fourth surface 122 for projection light rays emitted by the first projection light source 170 in the first function display region R111 decreases from 7.5% to 5.1%. In another embodiment, in the first function display region R111, in the case where the first projection light source 170 is configured to emit P-polarized light and the P-polarized reflective film is mounted, a reflectivity of the fourth surface 122 for projection light rays emitted by the first projection light source 170 in the first function display region R111 increases from 0.3% to 11%. In still another embodiment, in the first function display region R111, in the case where the first projection light source 170 is configured to emit S-polarized light and the S-polarized reflective film is mounted, the reflectivity of the fourth surface 122 for projection light rays emitted by the first projection light source 170 in the first function display region R111 increases from 13% to 22%.

Alternatively, the laminated glass 10 further has a transparent conductive layer. The transparent conductive layer is mounted between the first transparent substrate 110 and the second transparent substrate 120. The transparent conductive layer has at least one of heat insulation capacity and heating function for reflecting infrared rays, and the transparent conductive layer covers at least 80% of the light-transmitting region R20.

Optionally, the projection display distance for the first image P1 ranges from 0.5 m to 5 m. The first image P1 may indicate key information such as vehicle speed, fuel level, or the engine speed. Alternatively, the projection display distance of the second image P2 is greater than or equal to 7.5 m. The second image P2 may be a relatively large image which can indicate information such as route navigation, a speeding reminder, or obstacle warnings.

Although the embodiments of the disclosure have been illustrated and described above, it can be understood that the above embodiments are exemplary and cannot be understood as limitations on the disclosure. Those skilled in the art can make changes, modifications, replacements, and variations for the above embodiments within the scope of the disclosure, and these improvements and modifications are also considered to fall into the protection scope of the disclosure.

What is claimed is:

1. A laminated glass, comprising:
   a first transparent substrate having a first surface and a second surface opposite the first surface;
   a second transparent substrate having a third surface and a fourth surface opposite the third surface, wherein the third surface is closer to the second surface than the fourth surface; and
   an adhesive film disposed between the second surface and the third surface and configured to adhere the first transparent substrate and the second transparent substrate;

wherein the laminated glass has a light-transmitting region and a light-blocking region surrounding at least part of a periphery of the light-transmitting region; and wherein the light-transmitting region has a visible light transmittance greater than or equal to 70%, the light-blocking region has a visible light transmittance less than or equal to 5%, the light-blocking region has a first region located below the light-transmitting region, and the first region has one or more first function display regions for displaying of a first image; and wherein the laminated glass further comprises a masking layer, wherein the masking layer is disposed on the first transparent substrate or the second transparent substrate, located in the light-blocking region, and has a transmittance for light ray less than or equal to 5%, and the masking layer is configured to serve as a display background of the first image.

2. The laminated glass of claim 1, further comprising at least one flexible display screen in the first function display region, and the at least one flexible display screen is disposed between the second surface and the third surface and comprises at least one of a mini light-emitting diode (LED) display screen, a micro LED display screen, or an organic light-emitting diode (OLED) display screen.

3. The laminated glass of claim 1, wherein the first function display region is configured to receive a projection light ray for forming the first image that is incident at an angle of 50° to 72°; and the first function display region has a reflectivity for the projection light ray incident greater than or equal to 4%.

4. The laminated glass of claim 3, wherein the first function display region is part of the fourth surface, a proportion of S-polarized light in the projection light ray incident ranges from 60% to 100%, and the first function display region has the reflectivity for the projection light ray incident greater than or equal to 8%.

5. The laminated glass of claim 3, further comprising a dielectric film disposed in the first function display region, the dielectric film being on the third surface or the fourth surface, wherein
a proportion of P-polarized light in the projection light ray incident ranges from 60% to 100%, and the first function display region has the reflectivity for the projection light ray incident greater than or equal to 8%; or
a proportion of S-polarized light in the projection light ray incident ranges from 60% to 100%, and the first function display region has the reflectivity for the projection light ray incident greater than or equal to 8%.

6. The laminated glass of claim 3, further comprising a metal film disposed in the first function display region, the metal film being on the third surface, wherein a proportion of P-polarized light in the projection light ray incident ranges from 60% to 100%, and the first function display region has the reflectivity for the projection light ray incident greater than or equal to 6%.

7. The laminated glass of claim 3, further comprising a laminated polyethylene terephthalate (PET) disposed in the first function display, wherein a proportion of P-polarized light in the projection light ray incident ranges from 60% to 100%, and the first function display region has the reflectivity for the projection light ray incident greater than or equal to 10%.

8. The laminated glass of claim 2, further comprising a dark ink layer or a colored polymer film disposed in the light-blocking region, wherein the dark ink layer is disposed on at least one of the second surface or the third surface, and the colored polymer film is disposed between the second surface and the third surface; and the flexible display screen is closer to the fourth surface than the dark ink layer or the colored polymer film.

9. The laminated glass of claim 3, further comprising a dark ink layer or a colored polymer film disposed in the light-blocking region, wherein the dark ink layer is disposed on at least one of the second surface or the third surface, and the colored polymer film is disposed between the second surface and the third surface; and the first function display region is closer to the fourth surface than the dark ink layer or the colored polymer film.

10. The laminated glass of claim 1, wherein the fourth surface has a colored region, an upper boundary of the first region is at least 80 mm higher than an upper boundary of the colored region located in the first region.

11. The laminated glass of claim 1, wherein the light-transmitting region has one or more second function display regions, and the one or more second function display regions are configured for displaying of a second image.

12. The laminated glass of claim 11, wherein a projection display distance for the first image ranges from 0.5 m to 5 m, and a projection display distance for the second image is greater than or equal to 7.5 m.

13. The laminated glass of claim 12, wherein a projection light ray for forming the first image is incident on the one or more first function display regions at an angle of 50° to 72°, and the one or more first function display regions have a reflectivity, for the projection light ray for forming the first image, greater than or equal to 4%; and a projection light ray for forming the second image is incident on the one or more second function display regions at an angle of 50° to 72°, and the one or more second function display regions have a reflectivity, for the projection light ray for forming the second image, greater than or equal to 8%.

14. The laminated glass of claim 11, further comprising a dielectric film, wherein the dielectric film is at least located in the one or more second function display regions.

15. The laminated glass of claim 14, wherein the dielectric film is further located in the one or more first function display regions.

16. The laminated glass of claim 14, wherein the adhesive film is of uniform thickness, a proportion of P-polarized light in the projection light ray for forming the second image ranges from 60% to 100%, the dielectric film is a laminated structure formed by a high refractive index layer and a low refractive index layer stacked with each other or comprises at least one metal layer or laminated PET, and the one or more second function display regions have the reflectivity, for the projection light ray for forming the second image incident at an angle of 50° to 72°, greater than or equal to 10%.

17. The laminated glass of claim 14, wherein the adhesive film is of uniform thickness or wedge-shaped, the dielectric film is disposed on the fourth surface and is an anti-reflective film, and the second function display region is part of the first surface; a proportion of S-polarized light in the projection light ray for forming the second image ranges from 60% to 100%, and the anti-reflective film has a reflectivity for the projection light ray for forming the second image less than or equal to 6%; and the one or more second function display regions have the reflectivity, for the projection light ray for forming the second image incident at an angle of 50° to 72°, greater than or equal to 8%.

18. The laminated glass of claim 14, wherein the adhesive film is wedge-shaped, a proportion of S-polarized light in the projection light ray for forming the second image ranges from 60% to 100%; the dielectric film is a laminated structure disposed on the third surface or the fourth surface and formed by a high refractive index layer and a low refractive index layer stacked with each other; and the one or more second function display regions have the reflectivity, for the projection light ray for forming the second image incident at an angle of 50° to 72°, greater than or equal to 28%.

19. The laminated glass of claim 13, wherein the adhesive film is wedge-shaped, the second function display region is the fourth surface, a proportion of S-polarized light in the projection light ray for forming the second image ranges from 60% to 100%, and the one or more second function display regions have the reflectivity, for the projection light ray for forming the second image incident at the angle of 50° to 72°, greater than or equal to 8%.

20. A head-up display system, comprising a first projection light source and a laminated glass, the laminated glass comprising a first transparent substrate, a second transparent substrate, and an adhesive film, wherein the first transparent substrate has a first surface and a second surface opposite the first surface;

the second transparent substrate has a third surface and a fourth surface opposite the third surface, and the third surface is closer to the second surface than the fourth surface;

the adhesive film is disposed between the second surface and the third surface and configured to adhere the first transparent substrate and the second transparent substrate;

the laminated glass has a light-transmitting region and a light-blocking region surrounding at least part of a periphery of the light-transmitting region;

the light-transmitting region has a visible light transmittance greater than or equal to 70%, the light-blocking region has a visible light transmittance less than or equal to 5%, the light-blocking region has a first region located below the light-transmitting region, and the first region has one or more first function display regions for displaying of a first image;

the first projection light source is configured to emit a projection light ray for forming the first image to the first function display region; and the laminated glass further comprises a masking layer, wherein the masking layer is disposed on the first transparent substrate or the second transparent substrate, located in the light-blocking region, and has a transmittance for light ray less than or equal to 5%, and the masking layer is configured to serve as a display background of the first image.

\* \* \* \* \*